(12) United States Patent
Yokoyama et al.

(10) Patent No.: US 12,478,414 B2
(45) Date of Patent: Nov. 25, 2025

(54) BONE PLATE

(71) Applicant: OLYMPUS TERUMO BIOMATERIALS CORP., Tokyo (JP)

(72) Inventors: Yasuharu Yokoyama, Tokyo (JP); Toshihisa Iwanaga, Tokyo (JP)

(73) Assignee: OLYMPUS TERUMO BIOMATERIALS CORP., Tokyo (JP)

( * ) Notice: Subject to any disclaimer, the term of this patent is extended or adjusted under 35 U.S.C. 154(b) by 272 days.

(21) Appl. No.: 18/076,560

(22) Filed: Dec. 7, 2022

(65) Prior Publication Data

US 2023/0102016 A1 Mar. 30, 2023

Related U.S. Application Data

(63) Continuation of application No. PCT/JP2020/023035, filed on Jun. 11, 2020.

(51) Int. Cl.
*A61B 17/80* (2006.01)
*A61B 17/56* (2006.01)
*A61B 17/70* (2006.01)

(52) U.S. Cl.
CPC ...... *A61B 17/8061* (2013.01); *A61B 17/8057* (2013.01); *A61B 2017/564* (2013.01);
(Continued)

(58) Field of Classification Search
CPC ............ A61B 17/8061; A61B 17/8057; A61B 17/8052; A61B 17/80; A61B 17/8004;
(Continued)

(56) References Cited

U.S. PATENT DOCUMENTS

| 4,800,874 A | 1/1989 | David et al. |
|---|---|---|
| 5,938,664 A | 8/1999 | Winquist et al. |

(Continued)

FOREIGN PATENT DOCUMENTS

| AU | 2008/353332 B2 | 10/2009 |
|---|---|---|
| EP | 0947176 A2 | 10/1999 |

(Continued)

OTHER PUBLICATIONS

International Search Report for PCT/JP2020/023035 dated Aug. 11, 2020.
(Continued)

*Primary Examiner* — Marcela I. Shirsat
(74) *Attorney, Agent, or Firm* — United One Law Group LLC; Kongsik Kim; Jhongwoo Peck

(57) ABSTRACT

A bone plate including a long-plate-shaped main section to be disposed on a side surface of a diaphysis, a transverse section to be disposed on the side surface of an epiphysis, a coupling section coupling the transverse section and the main section to each other. The main section is twisted relative to the transverse section around an axis parallel to a longitudinal axis of the main section. when the bone plate is viewed in a transverse direction of the main section, the bone plate has a shape in conformity to the shin bone such that the coupling section is inclined relative to a longitudinal direction of the main section and the main section and the transverse section are bent to have a cranked shape in which the main section and the transverse section are offset relative to each other in a thickness direction of the bone plate.

13 Claims, 23 Drawing Sheets

(52) U.S. Cl.
CPC ..... *A61B 2017/568* (2013.01); *A61B 17/7059* (2013.01); *A61B 17/8004* (2013.01); *A61B 17/8014* (2013.01); *A61B 17/8052* (2013.01); *A61B 17/8095* (2013.01)

(58) Field of Classification Search
CPC ............ A61B 17/8014; A61B 17/8047; A61B 17/808; A61B 17/8095; A61B 17/84; A61B 17/846; A61B 17/86; A61B 17/8605; A61B 17/861; A61B 17/8625; A61B 17/88; A61B 17/8841; A61B 17/7059; A61B 17/7007; A61B 17/7058; A61B 17/58; A61B 217/564; A61B 217/568; A61B 17/56
USPC ................. 606/71, 280, 281, 286, 287, 291, 606/298–299, 86 R, 87, 86 B, 902, 915
See application file for complete search history.

(56) References Cited

U.S. PATENT DOCUMENTS

| | | |
|---|---|---|
| 6,623,486 B1 | 9/2003 | Weaver et al. |
| 2002/0013587 A1 | 1/2002 | Winquist et al. |
| 2002/0065516 A1 | 5/2002 | Winquist et al. |
| 2003/0199875 A1 | 10/2003 | Mingozzi et al. |
| 2004/0059334 A1 | 3/2004 | Weaver et al. |
| 2004/0059335 A1 | 3/2004 | Weaver et al. |
| 2004/0186477 A1 | 9/2004 | Winquist et al. |
| 2005/0010226 A1 | 1/2005 | Grady, Jr. et al. |
| 2005/0080421 A1 | 4/2005 | Weaver et al. |
| 2006/0004362 A1 | 1/2006 | Patterson et al. |
| 2006/0173458 A1 | 8/2006 | Forstein et al. |
| 2007/0162015 A1 | 7/2007 | Winquist et al. |
| 2007/0233106 A1 | 10/2007 | Horan et al. |
| 2008/0132960 A1 | 6/2008 | Weaver et al. |
| 2008/0300637 A1 | 12/2008 | Austin et al. |
| 2009/0143825 A1 | 6/2009 | Graham et al. |
| 2009/0177203 A1 | 7/2009 | Reiley |
| 2009/0248084 A1 | 10/2009 | Hintermann |
| 2010/0016858 A1 | 1/2010 | Michel |
| 2010/0030277 A1 | 2/2010 | Haidukewych et al. |
| 2011/0202093 A1 | 8/2011 | Grady, Jr. et al. |
| 2011/0301655 A1 | 12/2011 | Price et al. |
| 2013/0172943 A1 | 7/2013 | Austin et al. |
| 2013/0211463 A1 | 8/2013 | Mizuno et al. |
| 2013/0296943 A1 | 11/2013 | Grady, Jr. et al. |
| 2014/0121710 A1 | 5/2014 | Weaver et al. |
| 2015/0066095 A1 | 3/2015 | Austin et al. |
| 2015/0282851 A1 | 10/2015 | Michel |
| 2016/0074081 A1 | 3/2016 | Weaver et al. |
| 2016/0175018 A1 | 6/2016 | Grady, Jr. et al. |
| 2017/0007304 A1 | 1/2017 | Kuroda et al. |
| 2017/0027627 A1* | 2/2017 | Paik ....................... A61B 17/80 |
| 2017/0209194 A1* | 7/2017 | Ricker ............... A61B 17/8057 |
| 2018/0199966 A1 | 7/2018 | Grady, Jr. et al. |
| 2019/0069937 A1* | 3/2019 | Kuroda .............. A61B 17/8095 |
| 2019/0090921 A1 | 3/2019 | Kuroda et al. |
| 2020/0237420 A1 | 7/2020 | Grady, Jr. et al. |

FOREIGN PATENT DOCUMENTS

| | | |
|---|---|---|
| EP | 1308135 A2 | 5/2003 |
| EP | 2147647 A1 | 1/2010 |
| EP | 2623057 A1 | 8/2013 |
| EP | 2995270 A1 | 3/2016 |
| EP | 3123971 A1 | 2/2017 |
| EP | 3456276 A1 | 3/2019 |
| EP | 3466358 A1 | 4/2019 |
| FR | 2472373 A1 | 7/1981 |
| FR | 2980967 A1 | 4/2013 |
| JP | 2004-313514 A | 11/2004 |
| JP | 3124178 U | 8/2006 |
| JP | 2007-500069 A | 1/2007 |
| JP | 2009-527328 A | 7/2009 |
| JP | 2010-119638 A | 6/2010 |
| JP | 2010-220762 A | 10/2010 |
| JP | 2010-259823 A | 11/2010 |
| JP | 2011-515172 A | 5/2011 |
| JP | 2012-165976 A | 9/2012 |
| JP | 2014-050722 A | 3/2014 |
| JP | 1548337 S | 4/2016 |
| JP | 6250836 B | 12/2017 |
| KR | 30-0743077 S | 5/2014 |
| KR | 30-0743078 S | 5/2014 |
| WO | 01/19267 A1 | 3/2001 |
| WO | 2004/107957 A2 | 12/2004 |
| WO | 2007/100513 A2 | 9/2007 |
| WO | 2012/042592 A1 | 4/2012 |
| WO | 2015/146866 A1 | 10/2015 |
| WO | 2017/127295 A1 | 7/2017 |
| WO | 2017/195307 A1 | 11/2017 |
| WO | 2017/208318 A1 | 12/2017 |

OTHER PUBLICATIONS

International Search Report and Written Opinion for PCT/JP2015/058633 dated Jun. 23, 2015.
U.S. Office Action for U.S. Appl. No. 15/271,530 dated Dec. 21, 2016.
U.S. Office Action for U.S. Appl. No. 15/271,530 dated Feb. 2, 2018.
Japanese Office Action for JP 2016-510314 dated Aug. 22, 2017.
Korean Office Action for KR 10-2016-7025048 dated Aug. 22, 2017.
Extended European Search Report for EP 15769589.1 dated Nov. 6, 2017.
Singaporean Office Action for SG 11201607425Y dated Jan. 4, 2018.

* cited by examiner

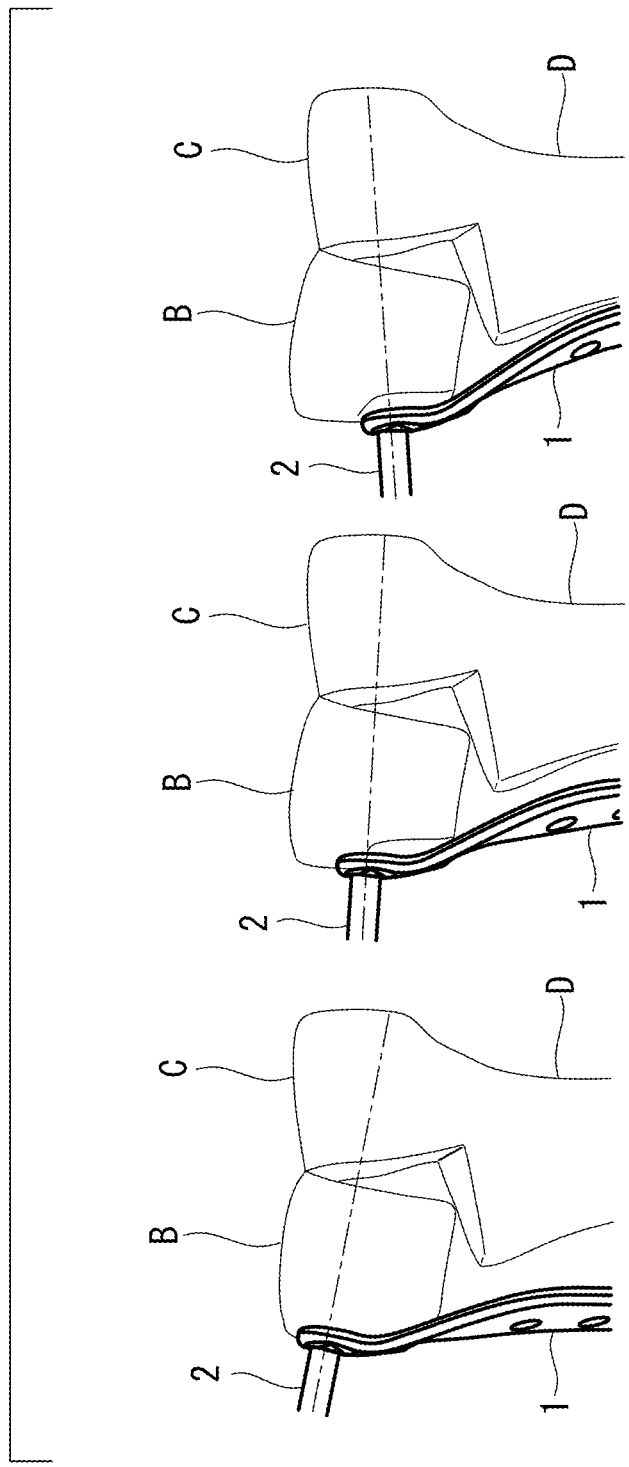

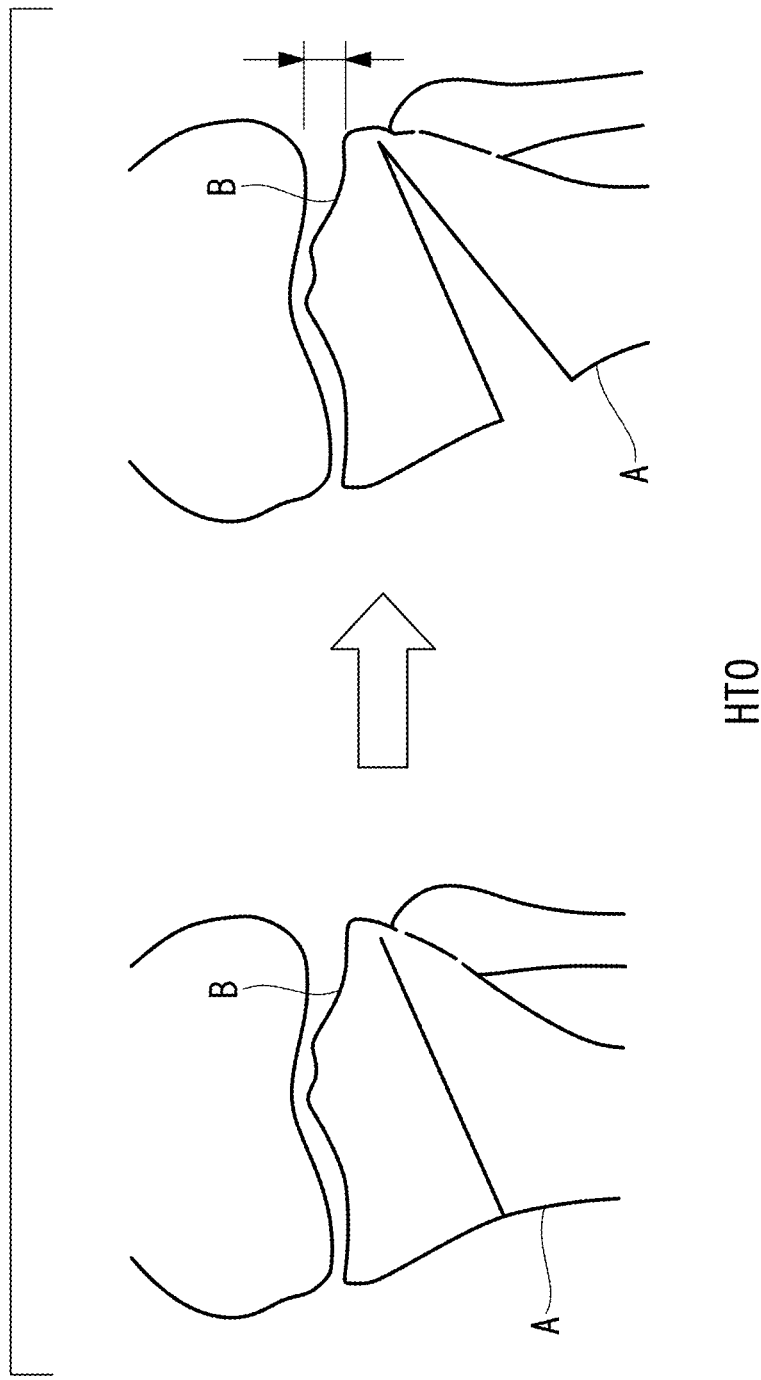

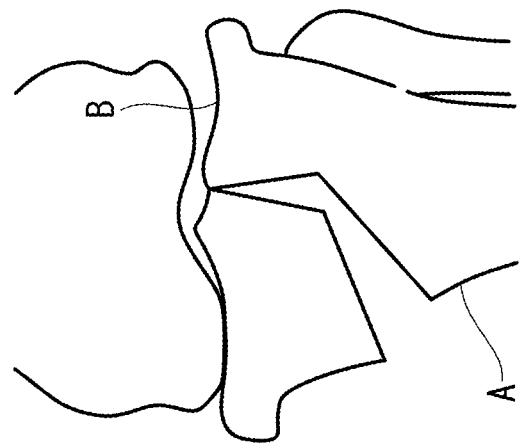
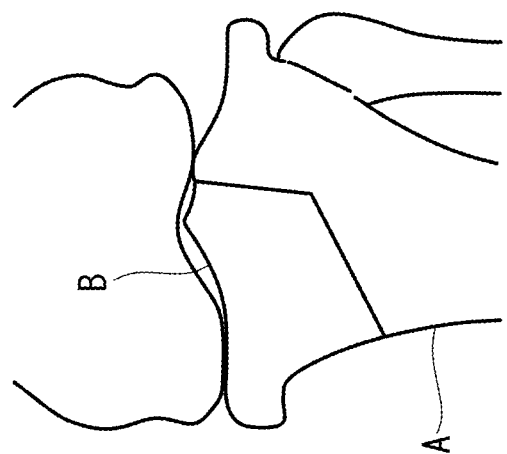
FIG. 12B

BONE PLATE

CROSS-REFERENCE TO RELATED APPLICATION(S)

This application is a Continuation of International Application No. PCT/JP2020/023035 filed on Jun. 11, 2020, the entire contents of which are incorporated herein by reference.

TECHNICAL FIELD

The present disclosure relates to bone plates.

RELATED ART

In the related art, orthopedic bone plates are known (for example, see PTLs 1 to 3).

PTLs 1 and 2 each disclose a bone plate for high tibial osteotomy (HTO), which is one of the methods for treating knee osteoarthritis. HTO involves forming an incision from the inner side toward the outer side of the shin bone and opening the incision to shift the load line of a varus knee from the inner side toward the outer side, thereby correcting the shin bone. Until the bone heals, the corrected shin bone is secured by using a bone plate and a bone screw.

CITATION LIST

Patent Literature

{PTL 1}
Japanese Patent Publication No. 5505767
{PTL 2}
Japanese Patent Publication No. 4322039
{PTL 3}
Japanese Patent Publication No. 6250836

SUMMARY

An aspect of the present disclosure provides a bone plate to be applied to a side surface of a shin bone where a side surface of an epiphysis protrudes relative to a side surface of a diaphysis, the bone plate to be fixed to the side surface of the shin bone by bone fixation members, the bone plate including a long-plate-shaped main section that is to be disposed on the side surface of the diaphysis and that has one or more through-holes into which the bone fixation member is inserted; a transverse section that is to be disposed on the side surface of the epiphysis and that is disposed at an one end side of the main section and also that has one or more through-holes into which the bone fixation member is inserted; and a coupling section coupling the transverse section and the main section to each other, wherein the main section is twisted relative to the transverse section around an axis that is parallel to a longitudinal axis of the main section, and wherein, when the bone plate is viewed in a transverse direction of the main section, the bone plate has a shape in conformity to the side surface of the shin bone such that the coupling section is inclined relative to a longitudinal direction of the main section and the main section and the transverse section are bent to have a cranked shape in which the main section and the transverse section are offset relative to each other in a thickness direction of the bone plate.

BRIEF DESCRIPTION OF DRAWINGS

FIG. 9 is another diagram explaining the disposition of the bone plate relative to the shin bone.

FIG. 12A is a diagram explaining HTO.

FIG. 12B is a diagram explaining TCVO.

DETAILED DESCRIPTION

A bone plate 1 and a bone plate system according to an embodiment of the present disclosure will be described below with reference to the drawings.

Figure 1A:
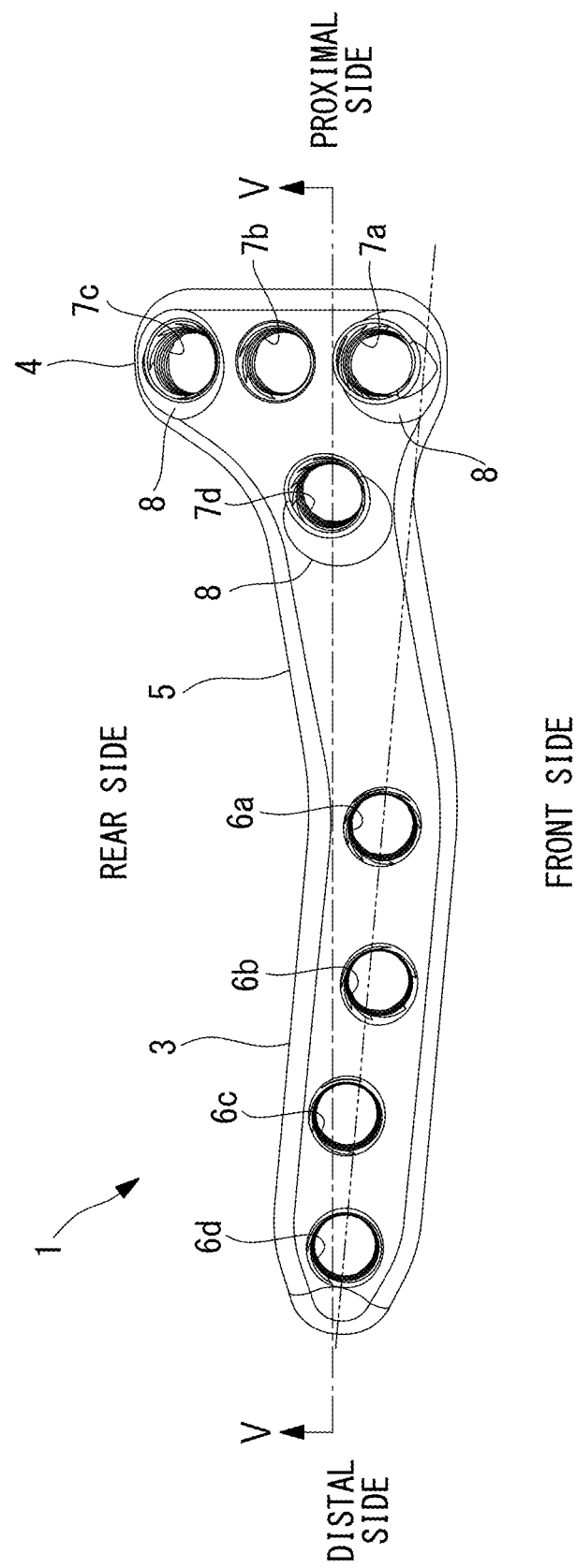
FIG. 1A is a front view of a bone plate according to an embodiment of the present disclosure.
Figure 1B:
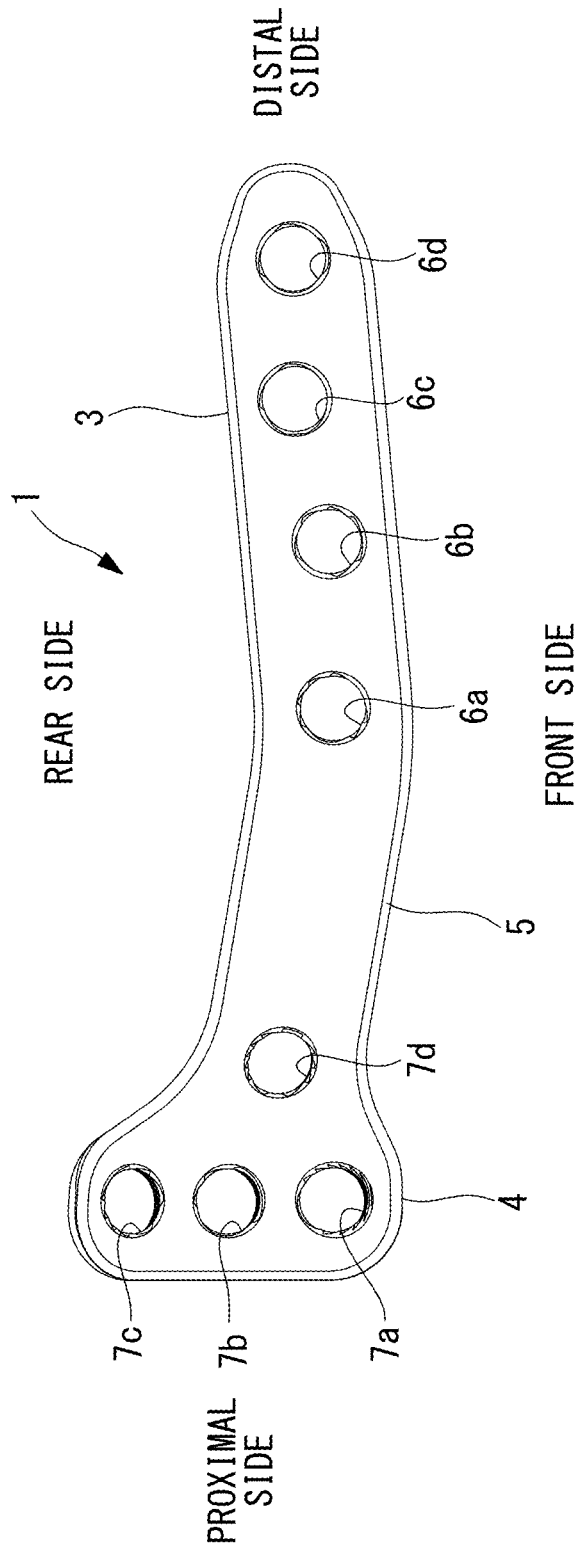
FIG. 1B is a rear view of the bone plate in FIG. 1A.
Figure 1C:
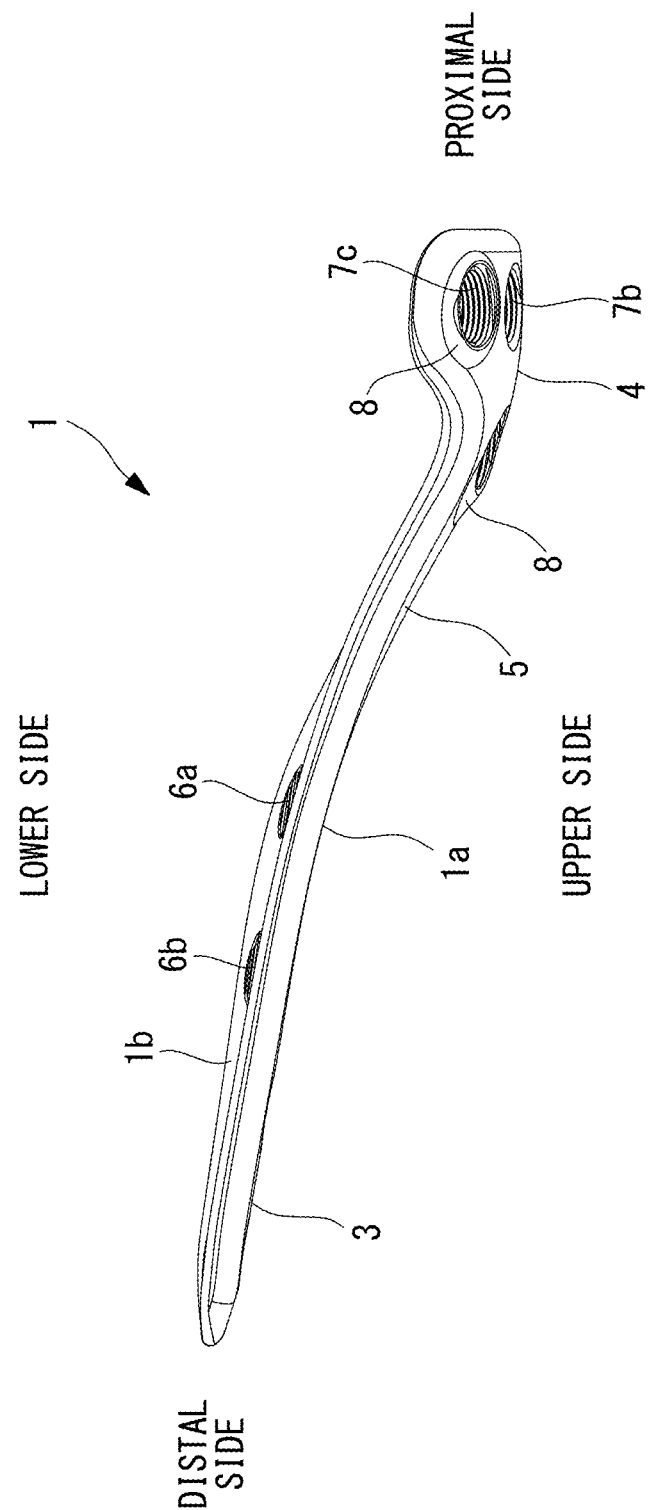
FIG. 1C is a plan view of the bone plate in FIG. 1A.
Figure 1D:
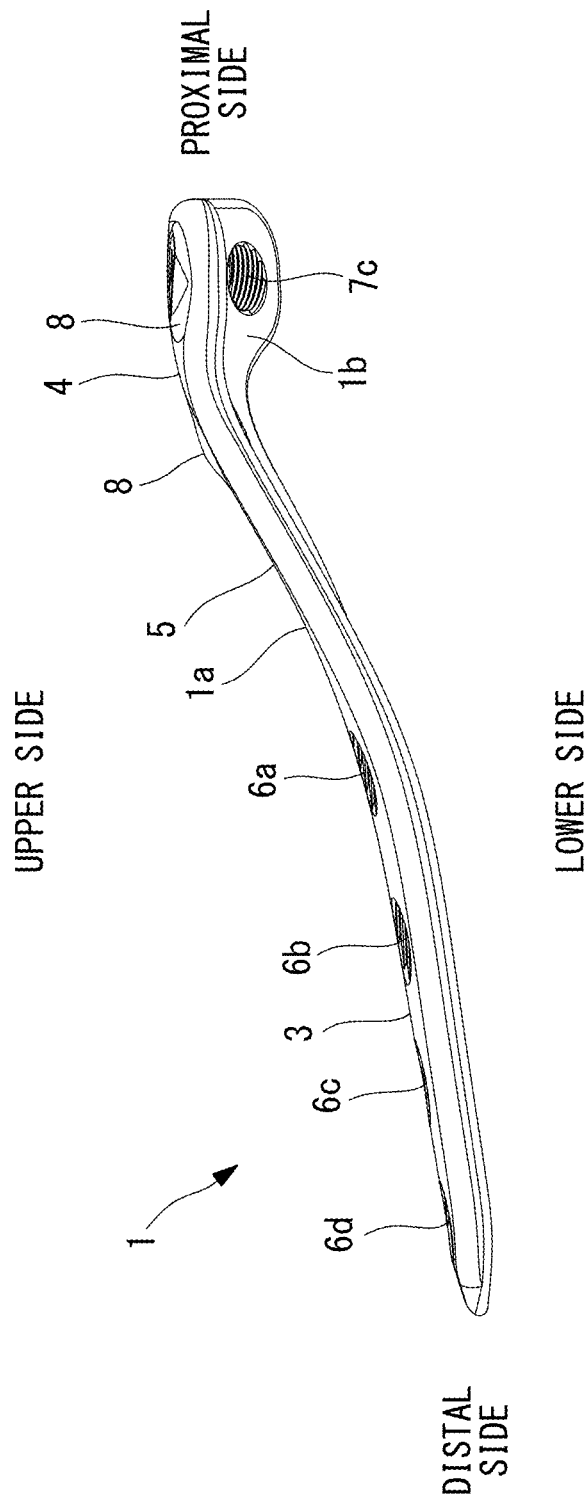
FIG. 1D is a bottom view of the bone plate in FIG. 1A.
Figure 1E:
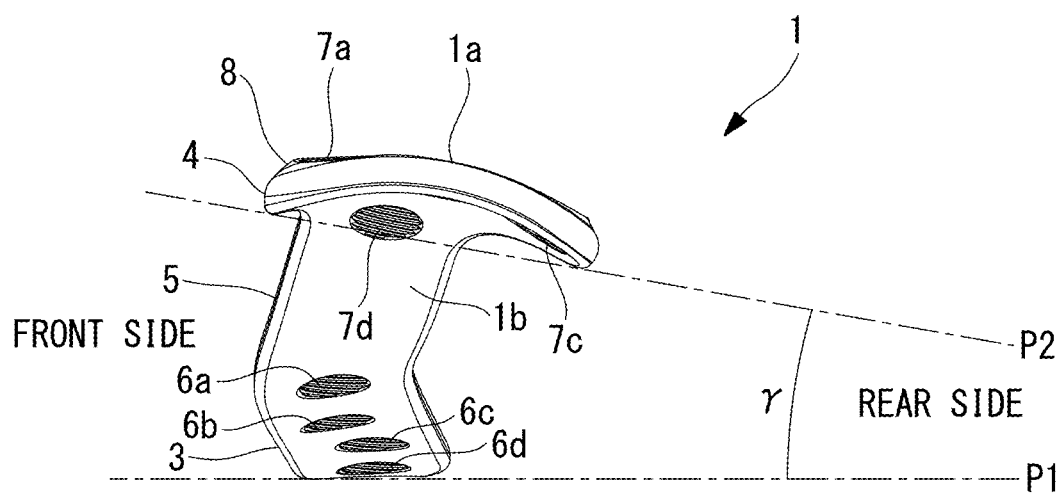
FIG. 1E is a right side view of the bone plate in FIG. 1A.
Figure 1F:
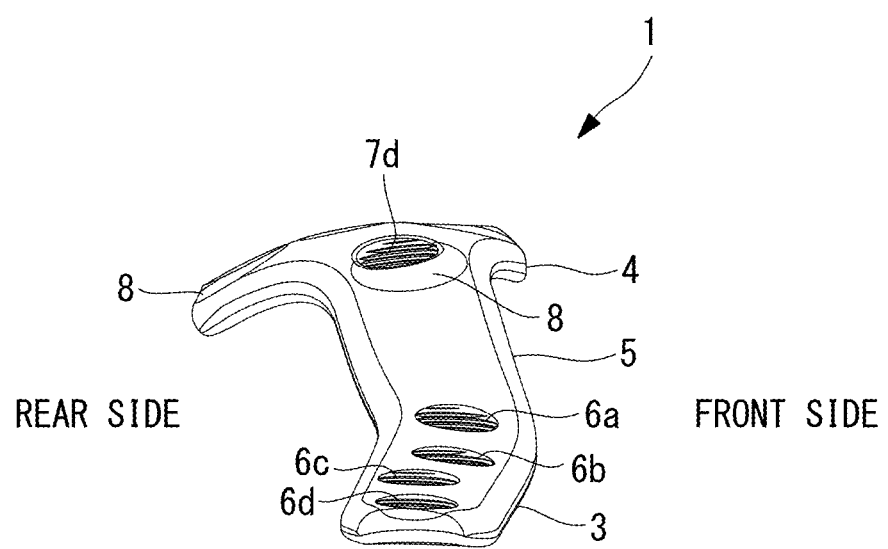
FIG. 1F is a left side view of the bone plate in FIG. 1A.
Figure 2A:
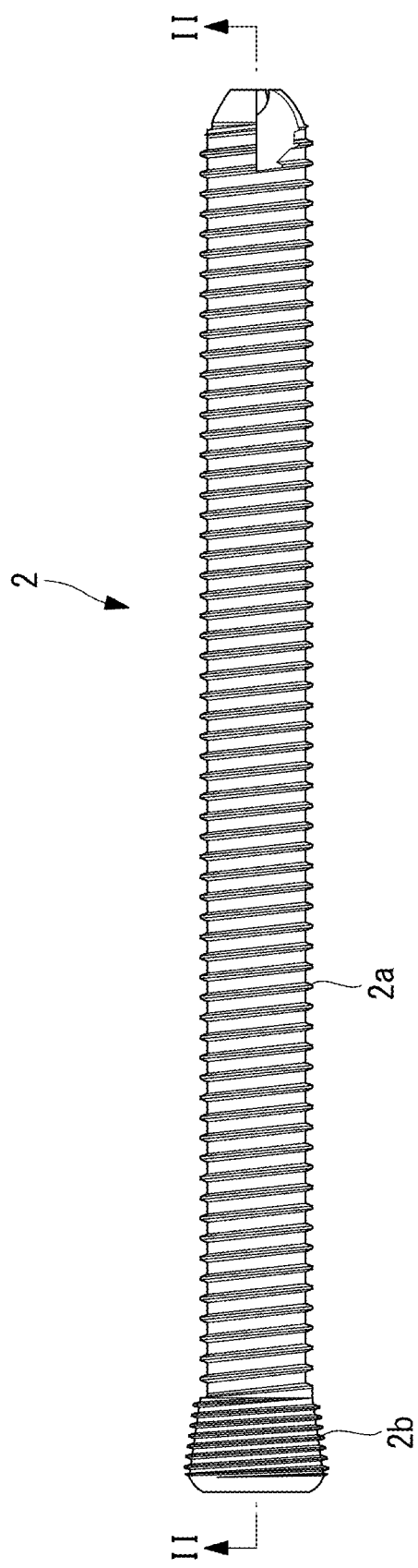
FIG. 2A is a front view of a bone fixation member according to an embodiment of the present disclosure.
Figure 2B:
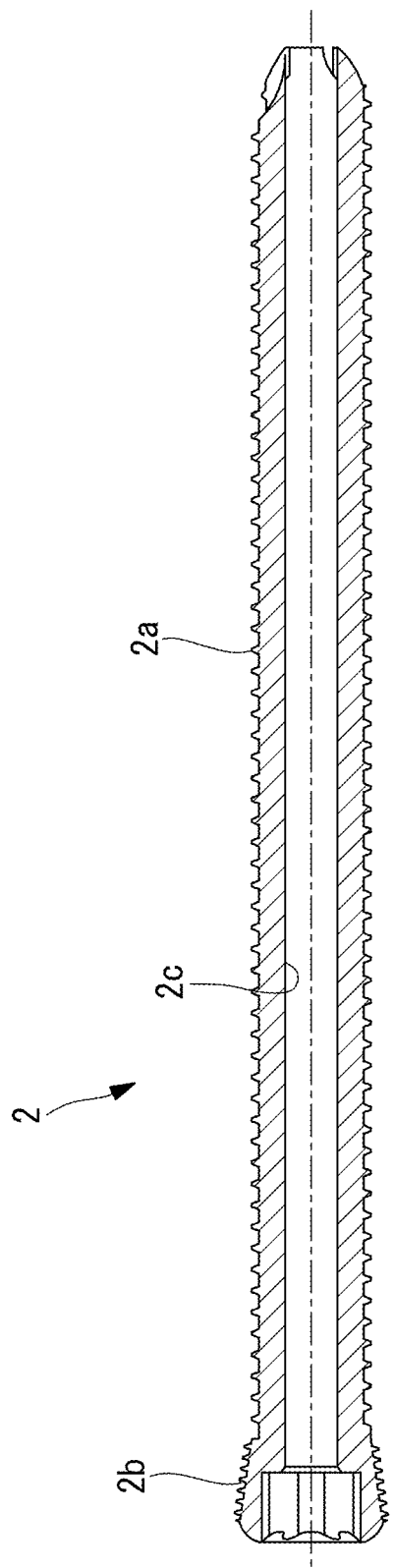
FIG. 2B is a vertical sectional view of the bone fixation member in FIG. 2A, taken along line II-II.
Figure 3A:
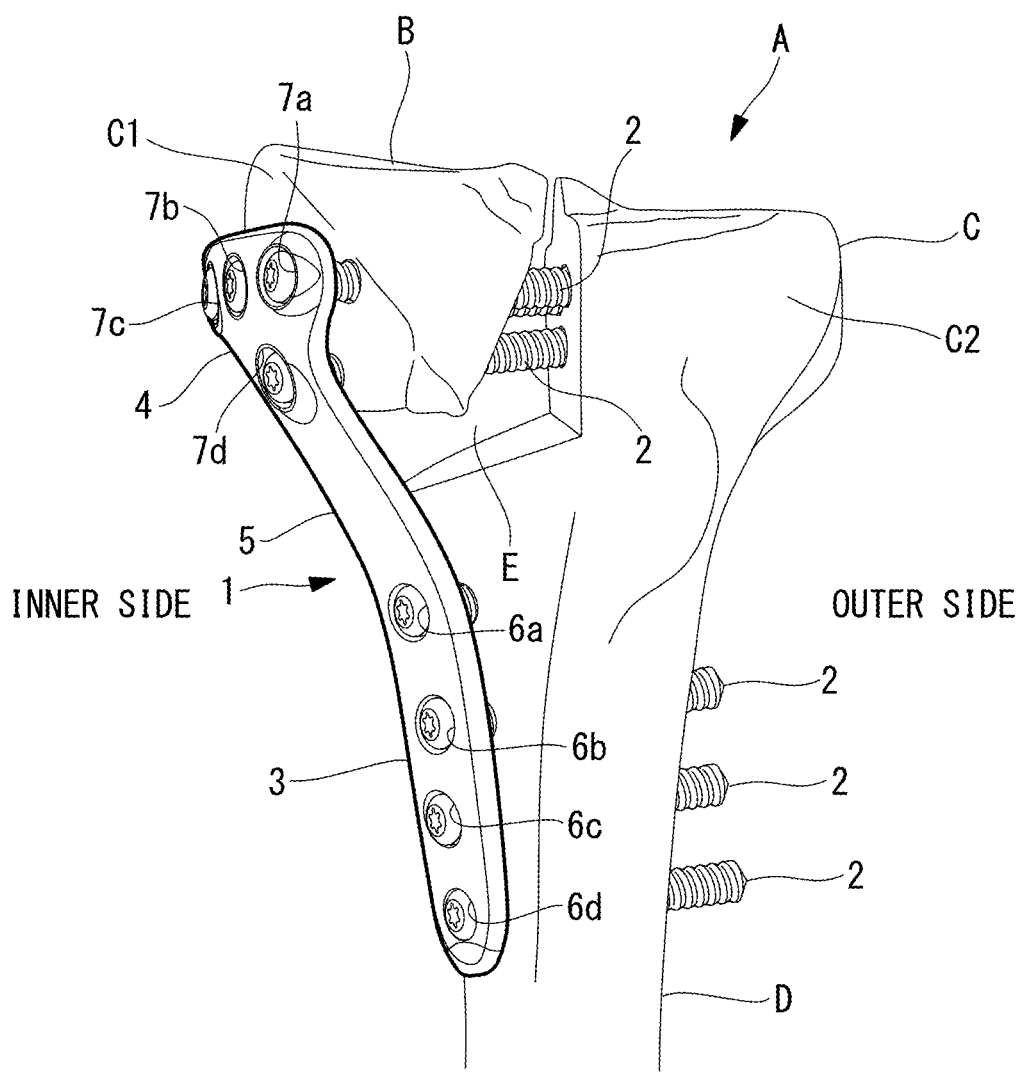
FIG. 3A illustrates a usage state of the bone plate and the bone fixation member, as viewed from the front side of a shin bone.
Figure 3B:
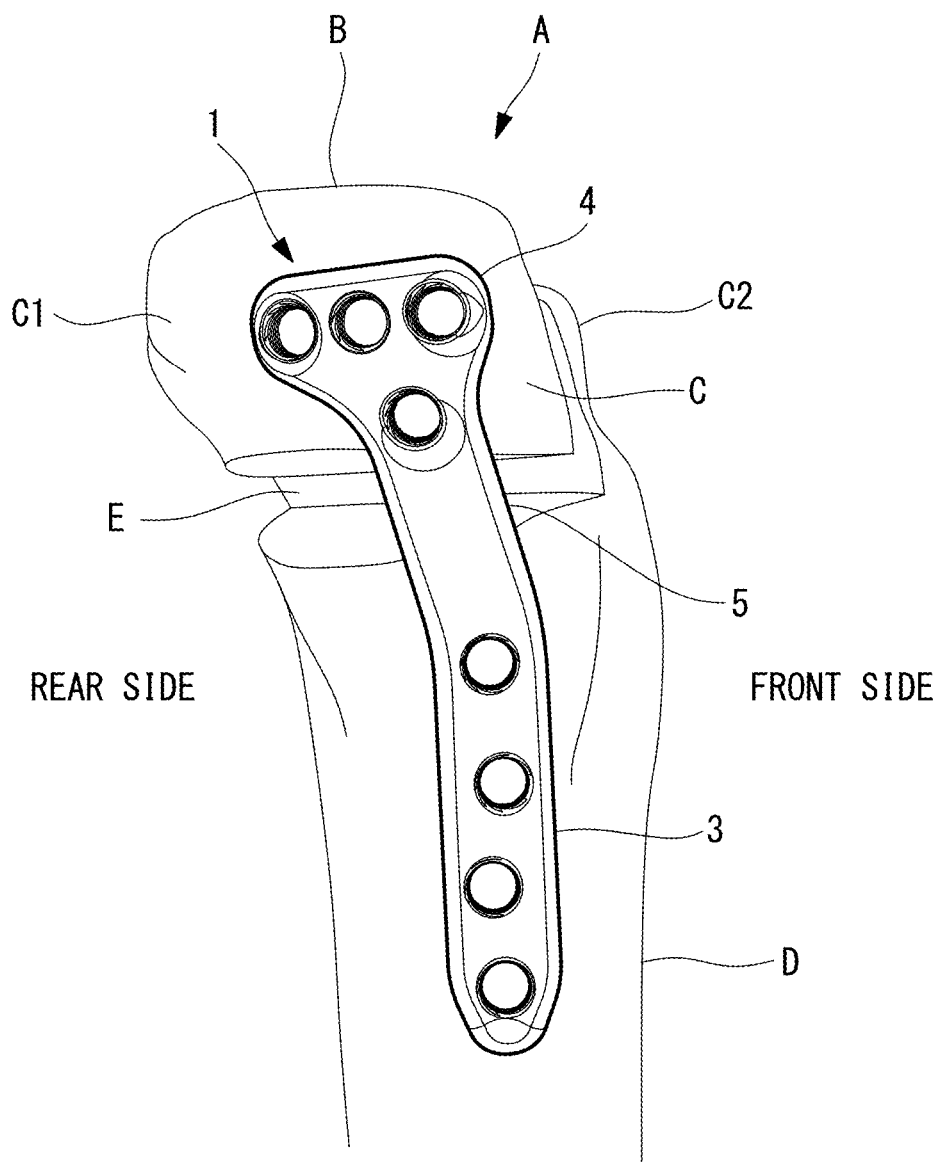
FIG. 3B illustrates a usage state of the bone plate, as viewed from the inner side of the shin bone.

FIGS. 1A to 1F illustrate a bone plate 1, FIGS. 2A and 2B illustrate a bone fixation member 2 to be inserted into any of through-holes 6a to 6d and 7a to 7d of the bone plate 1 for fixing the bone plate 1 to a shin bone A, and FIGS. 3A and 3B illustrate an example of a usage state of the bone plate 1 and the bone fixation member 2. As shown in FIGS. 1A to 3B, the bone plate system includes a bone plate 1 and a plurality of bone fixation members 2.

The bone plate system is applied to the side surface of the shin bone A where the side surface of an epiphysis C protrudes relative to the side surface of a diaphysis D. The description of this embodiment relates to a case where the bone plate system is used in tibial condylar valgus osteotomy (TCVO) that involves cutting the inner epiphysis C of the shin bone A into an L-shape.

As shown in FIGS. 3A and 3B, TCVO involves cutting the inner epiphysis C of the shin bone A into an L-shape from an inner side surface to a joint surface B and disconnecting a bone fragment C1 from the inner epiphysis C. Subsequently, the bone fragment C1 is rotated while being lifted upward so as to open a cut area E, and the outer joint surface B is brought into contact with the outer joint surface of the thigh bone. An artificial bone is inserted into the opened cut area E in accordance with the necessity. Then, the bone plate 1 is disposed on the inner side surface of the shin bone A, and the bone plate 1 is fixed to the epiphysis C and the diaphysis D by using the bone fixation members 2.

Accordingly, in TCVO, the disconnected bone fragment C1 is lifted by being rotated around substantially the center of the joint surface B. Therefore, as compared with HTO, the bone fragment C1 protrudes significantly inward relative to the diaphysis D. Furthermore, since the position of the bone fragment C1 is corrected such that the inner joint surface B conforms to the joint surface of the thigh bone depending on differences in the shape of the joint surface B among individuals, the bone fragment C1 may be lifted toward the front side or toward the rear side. Moreover, a gap may be formed in the joint surface B between the bone fragment C1 and an outer epiphysis C2.

Therefore, unlike HTO, the bone having undergone the correction in TCVO is in a form significantly different from that of the bone of a normal knee.

As shown in FIGS. 1A to 1F, the bone plate 1 includes a long-plate-shaped main section 3, a transverse section 4 disposed at one end of the main section 3, and a plate-shaped coupling section 5 that extends between the main section 3 and the transverse section 4 and that couples the main section 3 and the transverse section 4 to each other. The transverse section 4 extends in a direction intersecting the longitudinal direction of the main section 3 and is a plate that is shorter than the main section 3. Therefore, in a front view from the thickness direction of the main section 3, the bone plate 1 is a substantially L-shaped or T-shaped plate member. Furthermore, the bone plate 1 has an upper surface 1a and a lower surface 1b that are opposite to each other in the thickness direction.

The bone plate 1 has a proximal side, a distal side, a front side, a rear side, an upper side, and a lower side respectively corresponding to the proximal side, the distal side, the front side, the rear side, the inner side, and the outer side of the shin bone A. The bone plate 1 in the reference drawings is used for the shin bone A of the left leg. The transverse section 4 is disposed at the proximal side of the main section 3, and the upper surface 1a and the lower surface 1b are disposed at the upper side and the lower side, respectively. The bone plate 1 is disposed on the inner side surface of the shin bone A such that the lower surface 1b is in contact with the surface of the shin bone A.

In one design example of the bone plate 1, the main section 3 has a width ranging between 11 mm and 18 mm, the transverse section 4 has a width ranging between 20 mm and 40 mm, or preferably between 25 mm and 35 mm, and the coupling section 5 has a width ranging between 12 mm and 25 mm. The thickness of the bone plate 1 is preferably 3 mm±1 mm for achieving both high strength and thinness of the bone plate 1. A width is the dimension in the transverse direction of the main section 3.

The main section 3 has the plurality of through-holes 6a to 6d arranged with a distance therebetween and extending through the main section 3 in the thickness direction thereof. The transverse section 4 has the plurality of through-holes 7a to 7d arranged with a distance therebetween and penetrating through the transverse section 4 in the thickness direction thereof. The coupling section 5 does not have through-holes for the bone fixation members 2 except for the through-holes at the boundary with the main section 3 and at the boundary with the transverse section 4. In the shown example, the main section 3 has four through-holes 6a, 6b, 6c, and 6d arranged in the longitudinal direction of the main section 3, and the transverse section 4 has four through-holes 7a, 7b, 7c, and 7d arranged in two rows.

The number of through-holes in each of the main section 3 and the transverse section 4 may be one, two, three, or five or more. Furthermore, the plurality of through-holes in the transverse section 4 may be arranged in only one row in the longitudinal direction of the transverse section 4.

As shown in FIGS. 3A and 3B, the main section 3 is disposed on the inner side surface of the diaphysis D and along the longitudinal direction of the diaphysis D, and is fixed to the diaphysis D by using a plurality of bone fixation members 2. The transverse section 4 is disposed on the inner side surface of the bone fragment C1 and along the front-rear direction of the epiphysis C, and is fixed to the epiphysis C by using a plurality of bone fixation members 2. The coupling section 5 is disposed at the opened cut area E.

The area near the boundary between the transverse section 4 and the coupling section 5 is located at a corner of the distal end of the bone fragment C1. In order to accept the corner of the distal end of the bone fragment C1, the boundary between the transverse section 4 and the coupling section 5 may have a upwardly convex shape.

Figure 4:
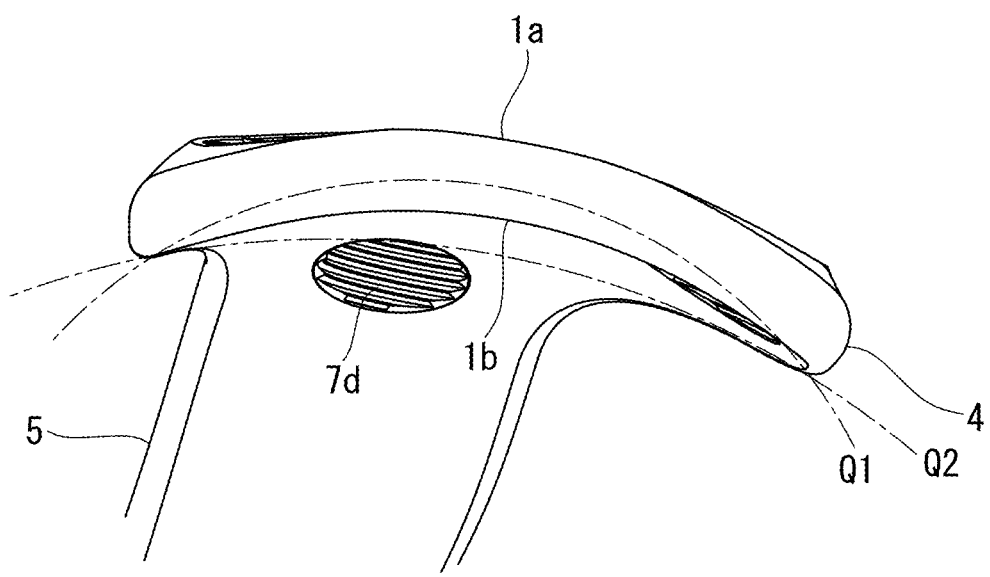
FIG. 4 is a right side view for explaining a design value of the bone plate.

As shown in FIGS. 1E and 1F, the bone plate 1 curves in the width direction (i.e., the transverse direction of the main section 3) entirely from the proximal end to the distal end, and the lower surface 1b is recessed in conformity to the protruding surface of the shin bone A. As shown in FIG. 4, in order to closely fit the lower surface 1b of the transverse section 4 onto the inner side surface of the bone fragment C1, the lower surface 1b of the transverse section 4 preferably extends between two circular arcs Q1 and Q2 in a side view of the bone plate 1 as viewed along the shorter-dimension-side axis of the transverse section 4 from the proximal side. The circular arcs Q1 and Q2 extend through both front and rear ends of the transverse section 4. The radius of curvature of the circular arc Q1 is 20 mm, and the radius of curvature of the circular arc Q2 is 40 mm.

Each bone fixation member 2 is a rod-like member and is, for example, a bone screw or a bone pin. As shown in FIG. 2A, the bone fixation member 2 has a rod-like shaft 2a to be inserted into the shin bone via any of the through-holes 6a to 6d and 7a to 7d and a head 2b that is fixed to the base end of the shaft 2a and that has a diameter larger than that of the shaft 2a.

As shown in FIG. 2B, the bone fixation member 2 may have a hollow section 2c extending through the bone fixation member 2 along the longitudinal axis of the shaft 2a.

The outer peripheral surface of the head 2b is provided with a male thread. The male thread is fastened to a female thread formed in the inner peripheral surface of any of the through-holes 6a to 6d and 7a to 7d, so that the shaft 2a is disposed coaxially with any of the through-holes 6a to 6d and 7a to 7d. In a case where the bone fixation member 2 is a bone screw, at least a part of the outer peripheral surface of the shaft 2a is provided with a male thread.

In TCVO, the bone fragment C1 is completely disconnected from the diaphysis D and the outer epiphysis C2. Therefore, the bone fragment C1 needs to be securely fixed to the outer epiphysis C2 continuing from the diaphysis D by using the bone fixation members 2. Moreover, a gap may sometimes be formed between the bone fragment C1 and the outer epiphysis C2.

Therefore, the bone fixation members 2 used for securing the transverse section 4 each have a long shaft 2a that can reach the outer side surface of the diaphysis D or near the outer surface thereof.

In TCVO, rod-like members, such as wires, are also used in addition to the bone fixation members 2. The through-holes 6a to 6d and 7a to 7d may each receive a rod-like member other than a bone fixation member 2. Depending on the intended purpose of the through-holes 6a to 6d and 7a to 7d, some of the through-holes 6a to 6d and some of the through-holes 7a to 7d do not need to have female threads.

Figure 3C:
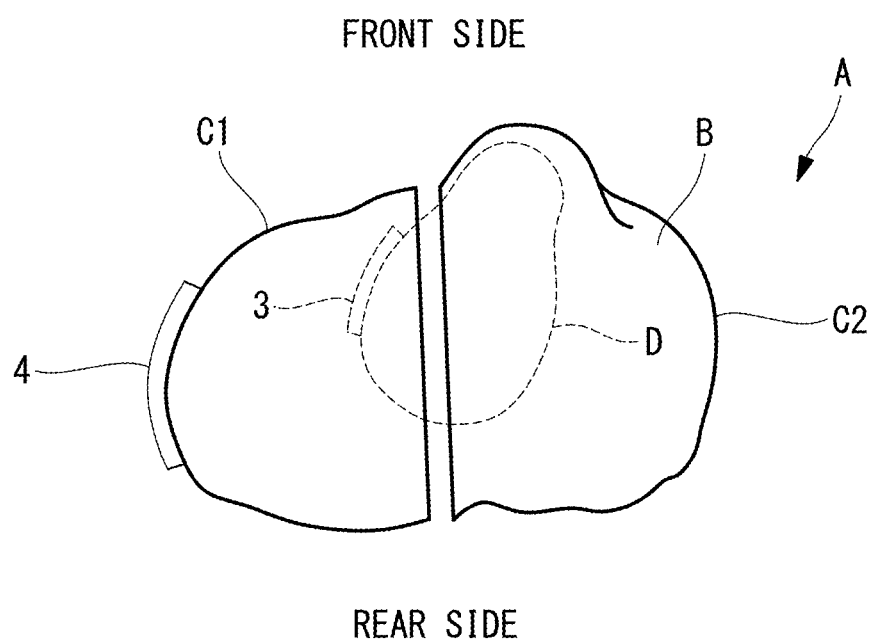
FIG. 3C illustrates the shin bone when the bone plate is being used, as viewed from the joint-surface side, and explains the positional relationship that a main section and a transverse section have with the shin bone.

The coupling section 5 is twisted forward around an axis parallel to the longitudinal axis of the main section 3 from the proximal side toward the distal side, and the main section 3 is disposed at the forward-twisted position relative to the transverse section 4. As shown in FIGS. 3B and 3C, in a state where the cut area E is opened, the inner side surface of the diaphysis D is offset forward relative to the inner side surface of the bone fragment C1. With the main section 3 being twisted forward relative to the transverse section 4, the main section 3 and the transverse section 4 can be properly disposed on the inner side surface of the diaphysis D and the inner side surface of the bone fragment C1, respectively.

As shown in FIG. 1E, in a side view along the shorter-dimension-side axis of the transverse section 4, an angle γ formed between a plane P1 and a plane P2 preferably ranges between 8° and 30° in view of the differences in the bone shape of the diaphysis D among individuals. The angle γ corresponds to a twist angle between the main section 3 and the transverse section 4. The plane P1 is parallel to the shorter-dimension-side axis of the transverse section 4 and is in contact with both the front and rear ends of the lower surface 1b of the main section 3. The plane P2 is parallel to the shorter-dimension-side axis of the transverse section 4 and is in contact with both the front and rear ends of the lower surface 1b of the transverse section 4.

As shown in FIGS. 1C and 1D, in a plan view or a bottom view of the bone plate 1 as viewed in the transverse direction of the main section 3, the main section 3 and the transverse section 4 are parallel or substantially parallel to each other, and the coupling section 5 is inclined downward from the proximal side toward the distal side relative to the longitudinal direction of the main section 3. In accordance with such a coupling section 5, the bone plate 1 curves in a cranked shape in which the main section 3 and the transverse section 4 are offset relative to each other in a direction parallel to the thickness direction. In particular, the transverse section 4 is offset upward relative to the main section 3.

Figure 5A:
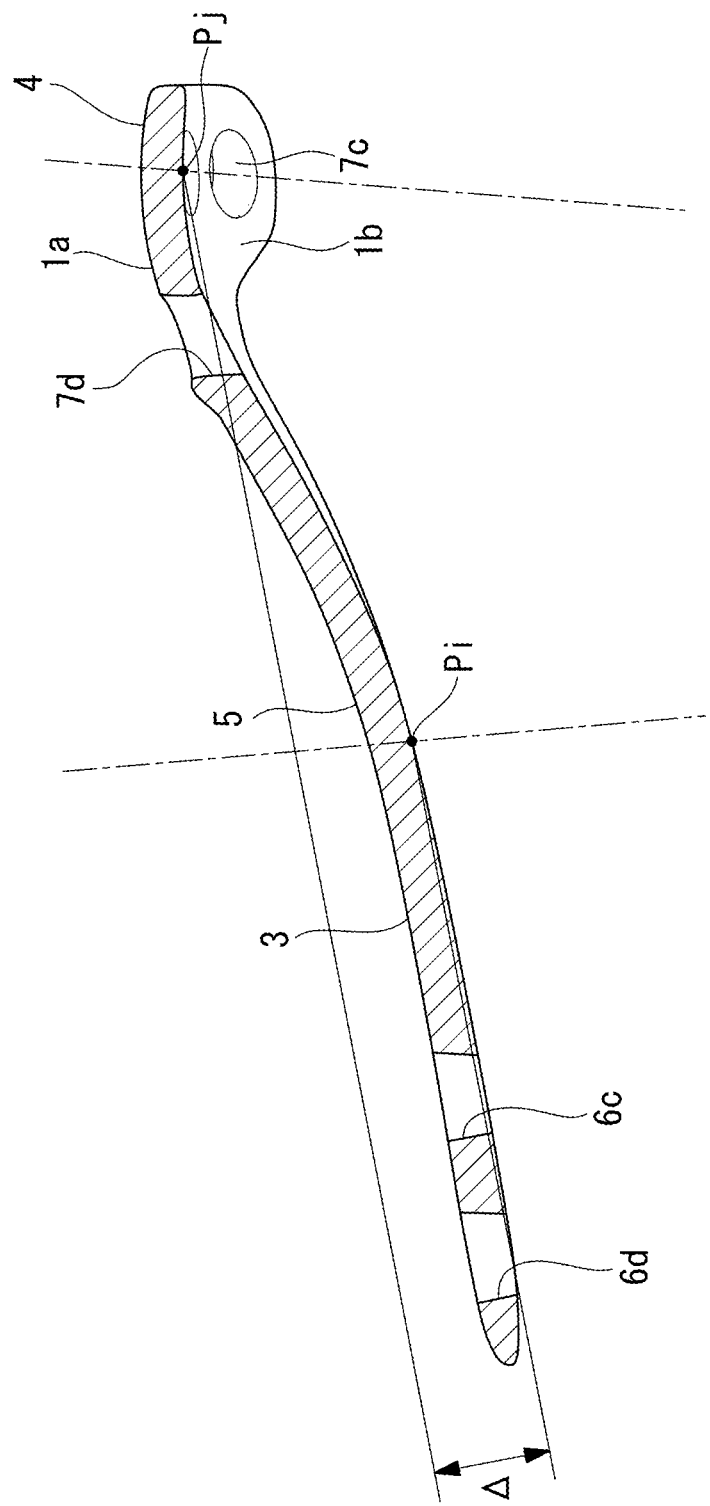
FIG. 5A illustrates an offset amount between the main section and the transverse section of the bone plate and is a vertical sectional view of the bone plate in FIG. 1A, as taken along line V-V.

FIG. 5A is a vertical sectional view of the bone plate 1, taken along the shorter-dimension-side axis of the transverse section 4. As shown in FIG. 5A, an offset amount A between the main section 3 and the transverse section 4 is preferably 9 mm±3 mm, and is more preferably 9 mm±1 mm. The offset amount A is the distance between two intersection points Pi and Pj in a direction orthogonal to the longitudinal axis of the main section 3. The intersection point Pi is where the center axis of the most-proximal through-hole 6a in the main section 3 and the lower surface 1b intersect each other, and the intersection point Pj is where the center axis of the most-proximal through-hole 7a in the transverse section 4 and the lower surface 1b intersect each other.

Figure 5B:
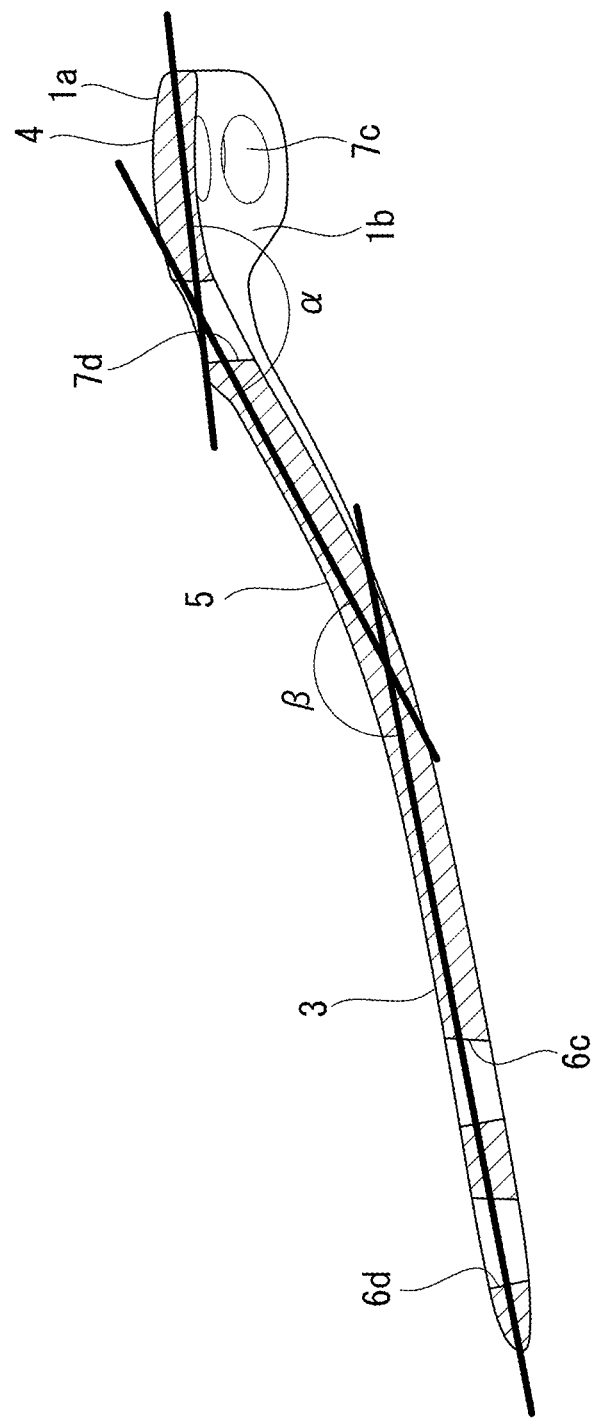
FIG. 5B illustrates a design value of the bone plate and is a vertical sectional view of the bone plate in FIG. 1A, as taken along line V-V.
Figure 5C:
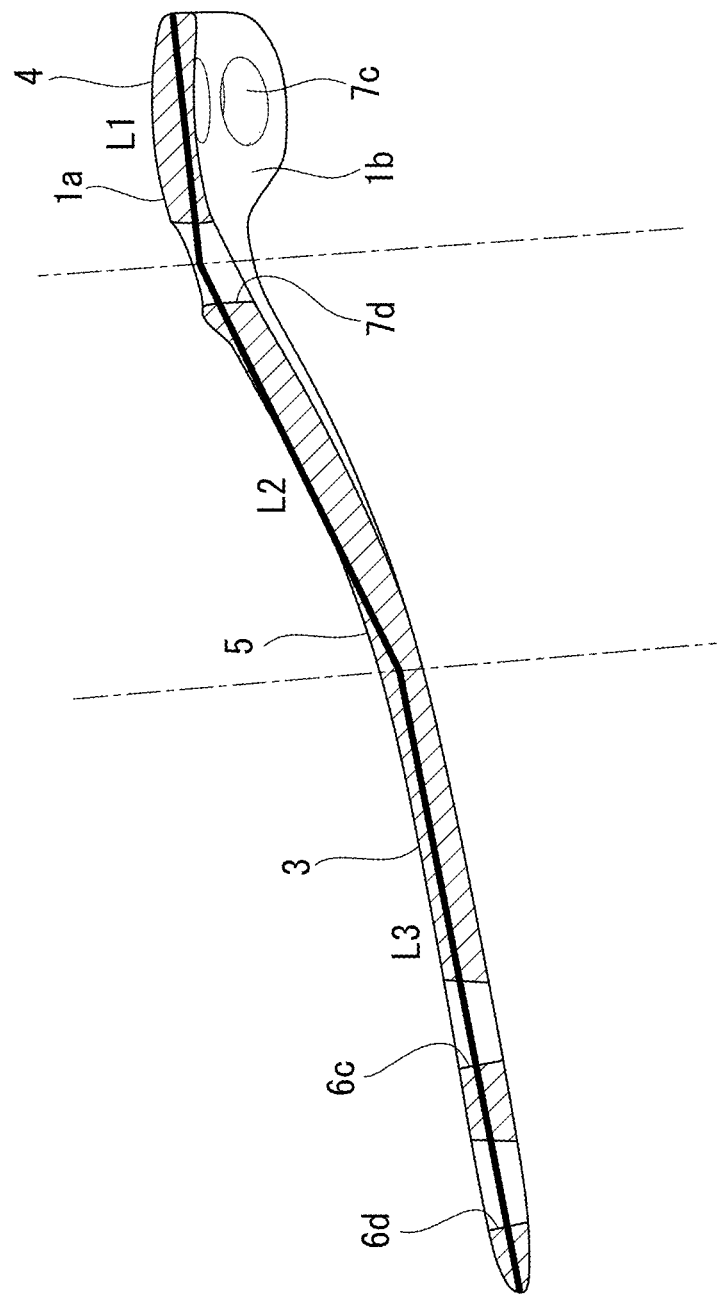
FIG. 5C illustrates another design value of the bone plate and is a vertical sectional view of the bone plate in FIG. 1A, as taken along line V-V.

Similar to FIG. 5A, FIGS. 5B and 5C are vertical sectional views of the bone plate 1, taken along the shorter-dimension-side axis of the transverse section 4, and illustrate a design example of the bone plate 1 for achieving an appropriate offset amount A between the main section 3 and the transverse section 4.

In the vertical sectional view of FIG. 5B, an angle α is 155°±10°, and an angle β, is 160°±10°. More preferably, the angle α is 160°±5°, and the angle β, is 165°±5°.

The angle α is formed between the shorter-dimension-side axis of the transverse section 4 and the longitudinal axis of the coupling section 5, and the angle β, is formed between the longitudinal axis of the coupling section 5 and the longitudinal axis of the main section 3.

In the vertical sectional view of FIG. 5C, a length L2 is 38.5 mm±5 mm, the sum of a length L1 and the length L2 is 59 mm±5 mm, and the sum of the length L1, the length L2, and a length L3 ranges between 104 mm and 135 mm. The length L1 is the length between the proximal end of the transverse section 4 and the center axis of the most-distal through-hole 7d in the transverse section 4. The length L2 is the length between the center axis of the most-distal through-hole 7d in the transverse section 4 and the center axis of the most-proximal through-hole 6a in the main section 3. The length L3 is the length between the center axis of the most-proximal through-hole 6a in the main section 3 and the distal end of the main section 3.

Next, the operation of the bone plate 1 and the bone plate system will be described.

In order to perform TCVO by using the bone plate system, the inner epiphysis C is cut into an L-shape, and the cut area E between the bone fragment C1 and the diaphysis D is opened by lifting the bone fragment C1 of the inner epiphysis C while rotating the bone fragment C1 around substantially the center of the joint surface B. An artificial bone is inserted into the opened cut area E, where necessary.

Then, the bone plate 1 is disposed on the inner side surface of the shin bone A such that the bone plate 1 extends astride the opened cut area E. The transverse section 4 is fixed to the epiphysis C by inserting the bone fixation members 2 into the epiphysis C via the through-holes 7a to 7d, and the main section 3 is fixed to the diaphysis D by inserting the bone fixation members 2 into the diaphysis D via the through-holes 6a to 6d.

In the state where the cut area E is opened, the inner side surface of the shin bone A has a shape in which the inner side surface of the bone fragment C1 protrudes significantly inward relative to the inner side surface of the diaphysis D. The bone plate 1 according to this embodiment has a cranked shape in which the transverse section 4 is offset relative to the main section 3 in the direction corresponding to the direction in which the bone fragment C1 protrudes relative to the diaphysis D. In a state where the cut area E is opened, this shape is in conformity to the inner side surface of the shin bone A. Therefore, the bone plate 1 can be suitably applied to TCVO. In detail, the bone plate 1 can be disposed on the shin bone A such that the main section 3 and the transverse section 4 come into contact with the inner side surface of the diaphysis D and the inner side surface of the epiphysis C, respectively, thereby preventing lifting of the bone plate 1 from the bone surface.

In particular, because the soft tissue covering the inner side of the shin bone A is thin, the lifting of the bone plate 1 from the surface of the shin bone A may lead to, for example, stretching of the skin at the inner side of the knee. This embodiment can prevent an effect on the soft tissue caused by the lifting of the bone plate 1 from the surface of the shin bone A.

In this embodiment, the through-holes 7a to 7d in the transverse section 4 are preferably arranged in at least two rows in the direction of the shorter-dimension-side axis of the transverse section 4. In the reference drawings, the three through-holes 7a to 7c are disposed in the first row at the proximal side, and the single through-hole 7d is disposed in the second row at the distal side. The through-hole 7a to 7c in the first row are preferably arranged at regular intervals.

Accordingly, with the through-holes 7a to 7d being arranged in two rows, the bone fragment C1 significantly lifted at the proximal side can be secured more stably by two rows of the bone fixation members 2 in the vertical direction.

Since there may be a case where a bone fixation member 2 is inserted near the cut area E, the through-hole 7d in the second row of the transverse section 4 is preferably provided at the boundary between the transverse section 4 and the coupling section 5 or at a position near the boundary, and the through-hole 6a at the most-proximal side of the main section 3 is preferably provided at the boundary between the coupling section 5 and the main section 3 or at a position near the boundary.

Furthermore, in order to prevent the shaft 2a from interfering with the cut surface, it is preferable that the minimal distance in the lower surface 1b between the bone fixation members 2 extending through the through-holes 7a, 7b, and 7c in the first row and the bone fixation member 2 extending through the through-hole 7d in the second row range between 3 mm and 15 mm. Moreover, a gap between the through-hole 7d in the second row and the through-hole 6a at the most-proximal side of the main section 3 preferably ranges between 28.5 mm and 45.0 mm. The aforementioned gap is the distance between the proximal edge of the through-hole 6a and the distal edge of the through-hole 7d and corresponds to a minimal distance between the under-head of the bone fixation member 2 extending through the through-hole 7d and the under-head of the bone fixation member 2 extending through the through-hole 6a. Furthermore, the outer diameter of the shaft 2a preferably ranges between 4.4 mm and 6.5 mm from the standpoint of strength.

As shown in FIG. 1A, in this embodiment, it is preferable that the bone plate 1 be substantially L-shaped such that the transverse section 4 extends rearward relative to the coupling section 5 and the main section 3 in plan view. In the substantially L-shaped bone plate 1, all of the through-holes 7a to 7d in the transverse section 4 are preferably disposed at the rear side of the longitudinal axis of the main section 3 indicated with a double-dot chain line in FIG. 1A. Moreover, when viewed along the longitudinal axis of the main section 3, it is preferable that the extensions of at least two center axes within the through-holes 6a to 6d in the main section 3 intersect the extensions of the center axes of all of the through-holes 7a to 7d in the transverse section 4 between the front and rear ends of the bone plate 1 in the transverse direction of the main section 3.

As shown in FIGS. 3B and 3C, the inner side surface of the epiphysis C is offset rearward relative to the inner side surface of the diaphysis D. With the substantially L-shaped bone plate 1, the main section 3 and the transverse section 4 can be disposed more readily on the inner side surface of the diaphysis D and the inner side surface of the epiphysis C, respectively, as compared with a substantially T-shaped bone plate 1. Moreover, this arrangement facilitates proper insertion of the bone fixation members 2 having the long shafts 2a into the epiphysis C and the diaphysis D.

In a front view of the substantially L-shaped bone plate 1, the longitudinal axis of the main section 3 and the longitudinal axis of the coupling section 5 may form an angle with each other, and the longitudinal axis of the coupling section 5 and the shorter-dimension-side axis of the transverse section 4 may form an angle with each other. In the example in FIG. 1A, the coupling section 5 is inclined forward from the proximal side toward the distal side relative to the shorter-dimension-side axis of the transverse section 4, and the angle between the longitudinal axis of the main section 3 and the longitudinal axis of the coupling section 5 is about 165°.

In the transverse section 4 of the substantially L-shaped bone plate 1, the through-hole 7d in the second row is preferably disposed between the two through-holes 7a and 7b at the front side of the first row.

If the width and the thickness of the transverse section 4 are increased for increasing the strength of the bone plate 1, the soft tissue around the epiphysis C receives a load. In a case where the through-hole 7d in the second row is provided near the center of the transverse section 4 in the width direction, it is preferable that the through-hole 7d be located between the two through-holes 7a and 7b at the front side in view of the load on the soft tissue.

Figure 6:
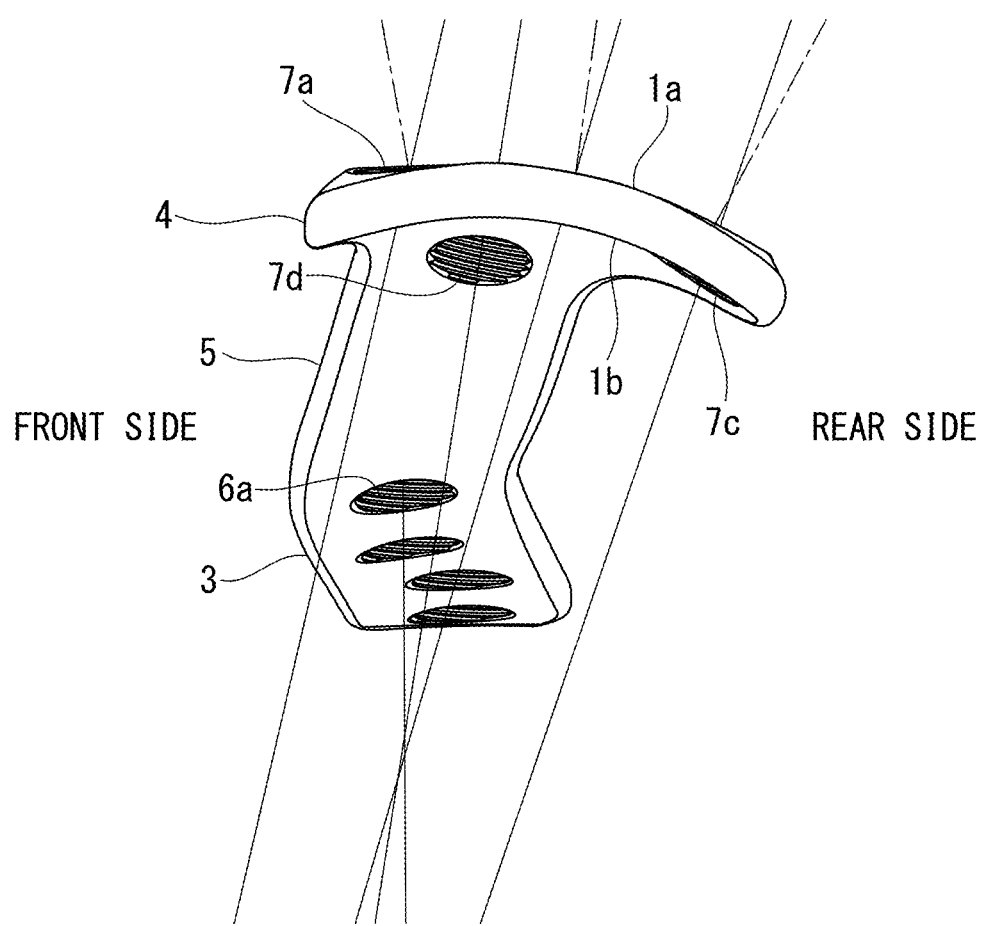
FIG. 6 is a right side view of the bone plate and illustrates the direction of the center axis of each through-hole in the transverse section.

Referring to FIG. 6, in a side view from the proximal side along the shorter-dimension-side axis of the transverse section 4, it is preferable in this embodiment that the center axes of all the through-holes 7a to 7d in the transverse section 4 be oriented in different directions from one another. In FIG. 6, solid lines indicate the center axes of the through-holes 7a to 7d.

In detail, the center axis of the through-hole (i.e., second through-hole) 7b at the center of the first row is inclined forward from the upper surface 1a toward the lower surface 1b relative to the normal to the tangent plane of the lower surface 1b in the through-hole 7b, and is preferably inclined at 8.5°±5° relative to the normal. The center axis of the through-hole (i.e., first through-hole) 7a at the front side in the first row is inclined forward from the upper surface 1a toward the lower surface 1b relative to the normal to the tangent plane of the lower surface 1b in the through-hole 7a, and is preferably inclined at 23°±5° relative to the normal. The center axis of the through-hole (i.e., third through-hole) 7c at the rear side in the first row is inclined rearward from the upper surface 1a toward the lower surface 1b relative to the normal to the tangent plane of the lower surface 1b in the through-hole 7c, and is preferably inclined at 9.5°±5° relative to the normal. The through-hole 7d in the second row is inclined forward from the upper surface 1a toward the lower surface 1b relative to the normal to the tangent plane of the lower surface 1b in the through-hole 7d, and is preferably inclined at 5°±5° relative to the normal.

In FIG. 6, each single-dot chain line indicates the normal to the tangent plane of the lower surface 1b in each of the through-holes 7a, 7b, and 7c.

Figure 7:
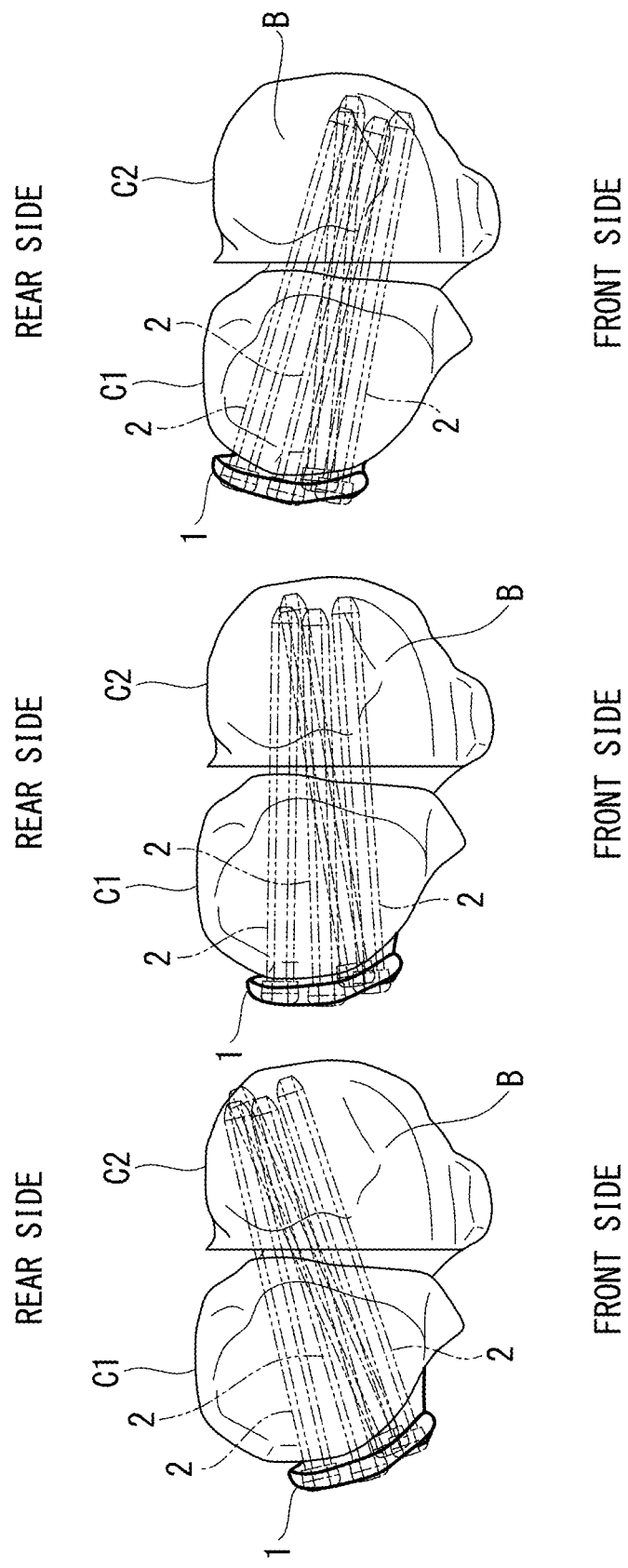
FIG. 7 illustrates the disposition of the bone plate relative to the shin bone.

In TCVO, the skin-cutting position tends to be located toward the front side of the knee. Therefore, as shown in the left part of FIG. 7, the bone plate 1 is often disposed toward the front side of the shin bone A. With the center axes of the through-holes 7a to 7d in the transverse section 4 being entirely inclined forward in the insertion direction of the bone fixation members 2, as mentioned above, the long shafts 2a can be properly inserted into the epiphysis C without protruding from the surface of the epiphysis C even in a case where the bone plate 1 is disposed toward the front side of the shin bone A. Furthermore, as shown in the right part of FIG. 7, even in a case where the bone plate 1 is disposed toward the rear side of the shin bone A, the long shafts 2a can be inserted into the epiphysis C without protruding from the surface thereof.

Moreover, it is preferable that the center axes of the through-holes 7a, 7b, and 7c in the first row be inclined toward one another in the front-rear direction as the center axes extend downward. Preferably, the center axes of the through-holes 7a, 7b, and 7c are inclined at angles where the shaft 2a of the bone fixation member 2 extending through the center through-hole 7b comes into contact with the shafts 2a of the bone fixation members 2 extending through the front and rear through-holes 7a and 7c at a position located away from the lower surface 1b by 80 mm to 120 mm.

In this configuration, the shafts 2a of the three bone fixation members 2 extending through the through-holes 7a, 7b, and 7c converge within the epiphysis C. Accordingly, as shown in the left and right parts of FIG. 7, even in a case where the bone plate 1 is disposed toward the front side or the rear side relative to the shin bone A, the long shafts 2a can be inserted to the outer side surface of the epiphysis C or near the outer side surface without protruding from the bone surface.

If the center axes of the through-holes 7a, 7b, and 7c are oriented differently from one another, it is preferable that each bone fixation member 2 used has the hollow section 2c.

If the center axes of the through-holes 7a to 7d are oriented differently from one another, it may be difficult for the surgeon to accurately assume the direction for inserting the bone fixation members 2 into the epiphysis C. A bone fixation member 2 having a hollow section 2c can be used in combination with a wire that guides the insertion of the bone fixation member 2 into the shin bone A. Specifically, the wire is inserted into the bone fragment C1 and the outer epiphysis C2 from the inner side toward the outer side while observing an X-ray image of the shin bone A, and the bone fixation member 2 is inserted into the bone fragment C1 and the outer epiphysis C2 along the guide wire. Accordingly, each bone fixation member 2 can be inserted into the epiphysis C in a desired direction.

Furthermore, in the side view from the proximal side along the shorter-dimension-side axis of the transverse section 4, it is preferable that the direction of the center axis of at least one of the through-holes 6a to 6d in the main section 3 be different from the directions of all the through-holes 7a to 7d in the transverse section 4. In detail, as shown in FIG. 6, the center axis of at least one of the through-holes 6a to 6d is preferably inclined rearward toward the lower side at an inclination angle larger than those of the through-holes 7c and 7d.

With this configuration, each shaft 2a can be properly inserted in accordance with the diaphysis D offset forward relative to the epiphysis C.

Figure 8A:
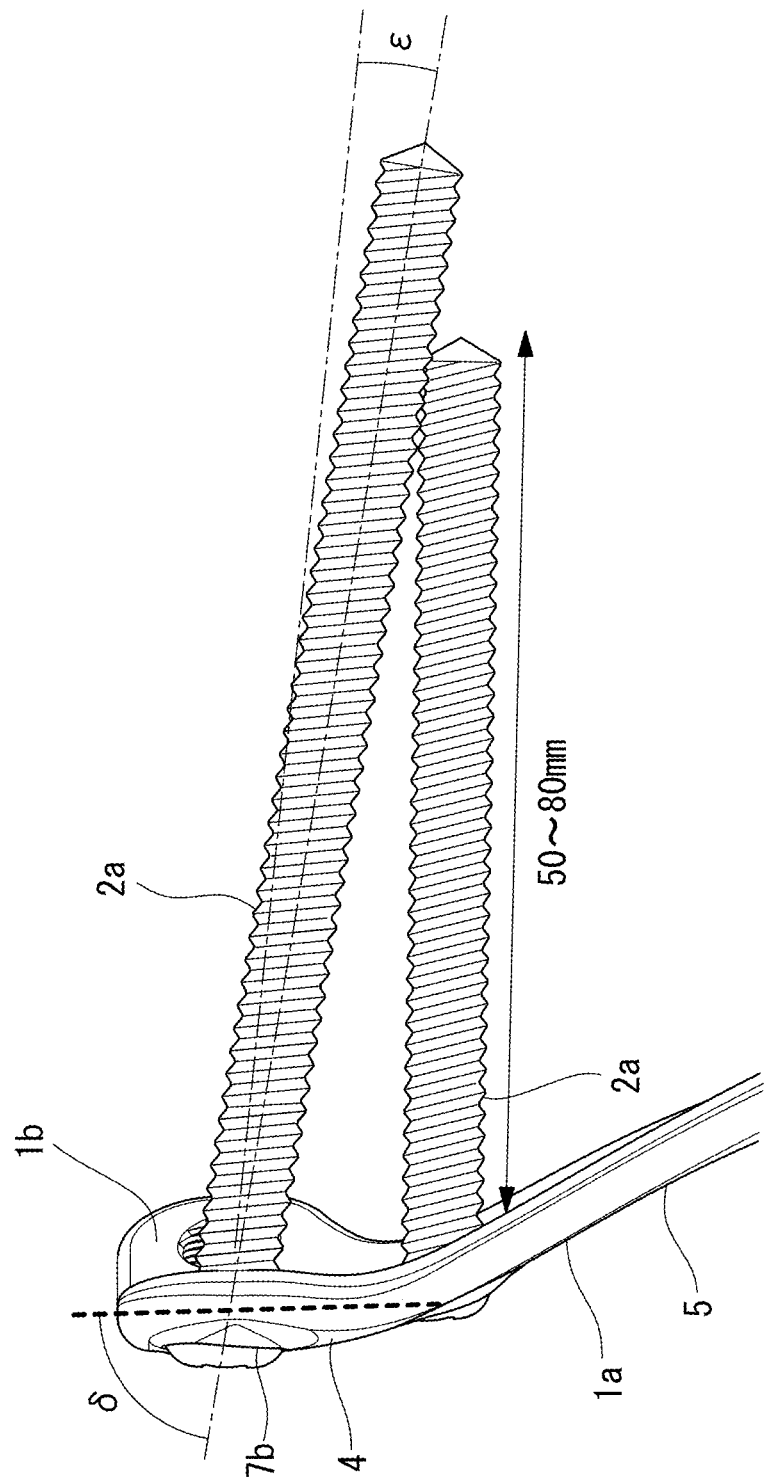
FIG. 8A is a bottom view explaining the positional relationship between the directions of the center axes of the through-holes in the transverse section and bone fixation members inserted into the through-holes in the transverse section.
Figure 8B:
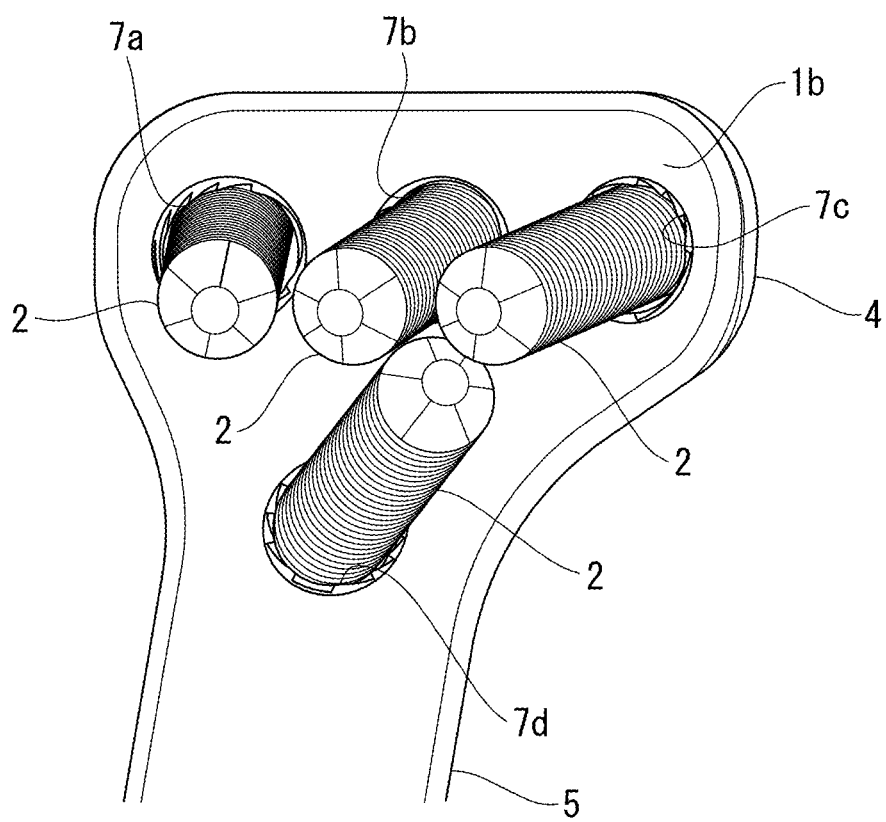
FIG. 8B is a rear view of the bone plate and the bone fixation members in FIG. 8A.

As shown in FIGS. 8A and 8B, in a plan view or a bottom view in the width direction, it is preferable in this embodiment that the center axes of the three through-holes not arranged on the same straight line in the transverse section 4 be inclined toward one another as the center axes extend downward.

In detail, the directions of the center axes of the through-holes 7a to 7d are designed such that the tip end of the shaft 2a of the bone fixation member 2 extending through the through-hole 7d in the second row is in contact with the tip ends of the shafts 2a of the bone fixation members 2 extending through two of the three through-holes 7a, 7b, and 7c in the first row, preferably, the tip ends of the shafts 2a of the bone fixation members 2 extending through the rear and center through-holes 7c and 7b.

The tip ends of the three shafts 2a are preferably in contact with one another within the outer epiphysis C2. In detail, as shown in FIG. 8A, the shaft 2a of the bone fixation member 2 extending through the through-hole 7d is preferably in contact with the two remaining shafts 2a at a position located away from the lower surface 1b by 50 mm to 80 mm.

In this configuration, the three bone fixation members 2 that are in contact with one another at a single point constitute a three-dimensional truss structure. Accordingly, the load bearing characteristics can be improved, as compared with a case where the three bone fixation members 2 receive a load independently of one another. Moreover, if at least the tip ends of the shafts 2a are individually provided with male threads, the male threads engage with one another at the contact position, so that the three-dimensional truss structure becomes more stable.

The load bearing characteristics of the three-dimensional truss structure are dependent on the outer diameter of each shaft 2a. In view of the load to be received by the shin bone A, the outer diameter of each shaft 2a preferably ranges between 4.4 mm and 6.5 mm for ensuring the load bearing characteristics of the three-dimensional truss structure.

As shown in FIGS. 8A and 8B, in the plan view or the bottom view, it is preferable that the center axes of the three through-holes 7a, 7b, and 7c arranged in a single row in the longitudinal direction of the transverse section 4 be inclined at the same inclination angle toward the proximal side or the distal side, and that the three bone fixation members 2 extending through the three through-holes 7a, 7b, and 7c in the first row be disposed in the same plane.

If the through-holes 7a, 7b, and 7c in the first row are inclined at different inclination angles toward the proximal side or the distal side, the three bone fixation members 2 in the first row are inserted into the epiphysis C at different insertion angles relative to the joint surface B. Therefore, there is a possibility that the bone fixation members 2 used may require shafts 2a with different lengths depending on the insertion angles. In the case where the center axes of the through-holes 7a, 7b, and 7c are inclined at the same inclination angle, the bone fixation members 2 used can have shafts 2a with the same length.

In this case, it is preferable that the center axes of the three through-holes 7a, 7b, and 7c be inclined toward the distal side from the upper surface 1a toward the lower surface 1b such that the three bone fixation members 2 in the same plane are disposed toward the distal side of the bone plate 1 than the proximal side. Preferably, as shown in FIG. 8A, the center axes of the three through-holes 7a, 7b, and 7c are inclined at an angle ε of 5°±3° toward the distal side relative to the normal to the tangent plane of the upper surface 1a at the center of the transverse section 4. Furthermore, in the plan view or the bottom view, it is preferable that the center axes of the three through-holes 7a, 7b, and 7c be inclined at an angle δ of 77°±5° relative to a line segment (see a bold dashed line) that connects the proximal end of the transverse section 4 with the boundary between the transverse section 4 and the coupling section 5.

As shown in FIG. 9, the direction in which each bone fixation member 2 is inserted into the shin bone A varies depending on how the bone plate 1 is disposed on the shin bone A. The inner joint surface B is often higher than the outer joint surface B. With the center axes of the through-holes 7a, 7b, and 7c being inclined toward the distal side, each bone fixation member 2 inserted in the epiphysis C can be prevented from interfering with the joint surface B regardless of how the bone plate 1 is disposed on the shin bone A.

On the other hand, in order for the transverse section 4 to avoid interference with a bone spur (not shown) near the inner joint surface B, the transverse section 4 is disposed at a position offset toward the distal side from the joint surface B. Therefore, it is not preferable for the three bone fixation members 2 in the first row to be inclined excessively toward the distal side, and the three bone fixation members 2 are preferably inserted parallel to the joint surface B as much as possible. Therefore, as mentioned above, the three through-holes 7a, 7b, and 7c preferably have an inclination angle ε of 5°±3° and an inclination angle δ of 77°±5°.

Figure 10A:
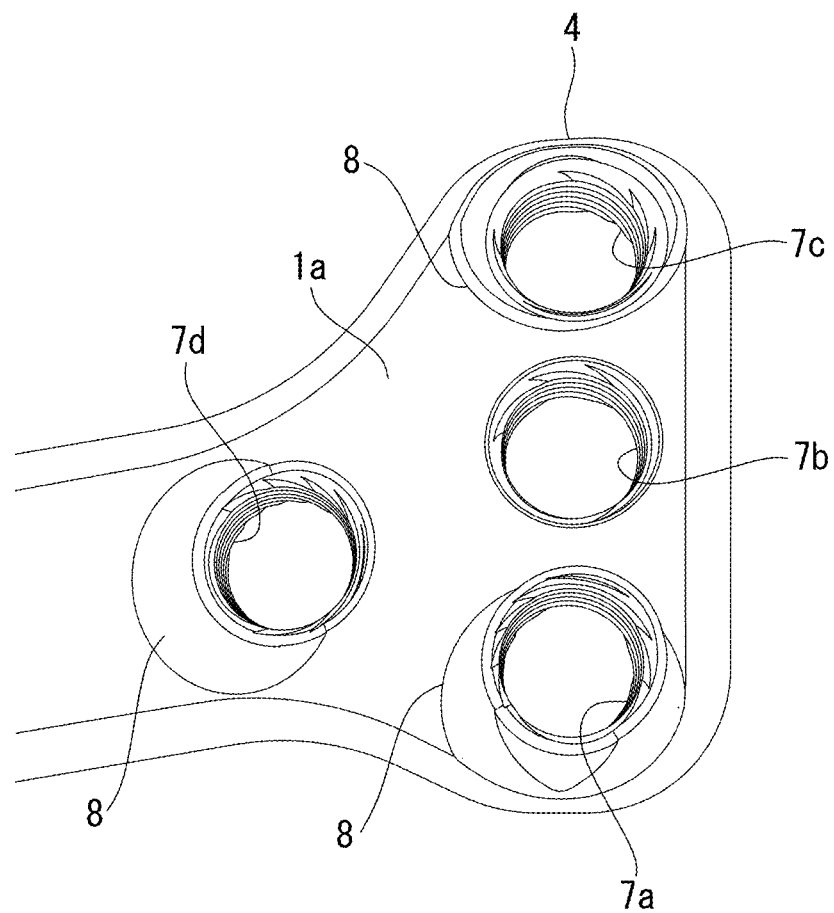
FIG. 10A is an enlarged front view of the transverse section.
Figure 10B:
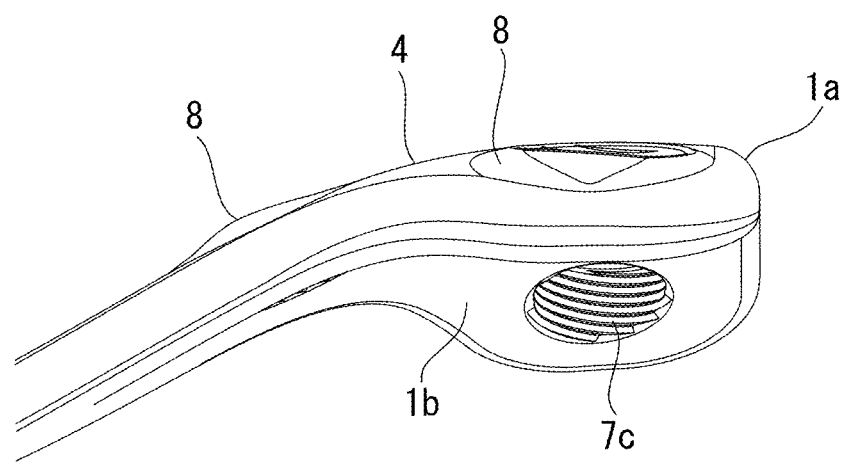
FIG. 10B is an enlarged bottom view of the transverse section.

As shown in FIGS. 10A and 10B, in order to prevent the heads 2b in the through-holes 7a, 7c, and 7d in the transverse section 4 from partially protruding from the upper surface 1a, a protrusion 8 may be provided around each of the through-holes 7a, 7c, and 7d in this embodiment. Each protrusion 8 bulges upward relative to the upper surface 1a that surrounds the protrusion 8 and is an area with a locally increased thickness.

Figure 11A:
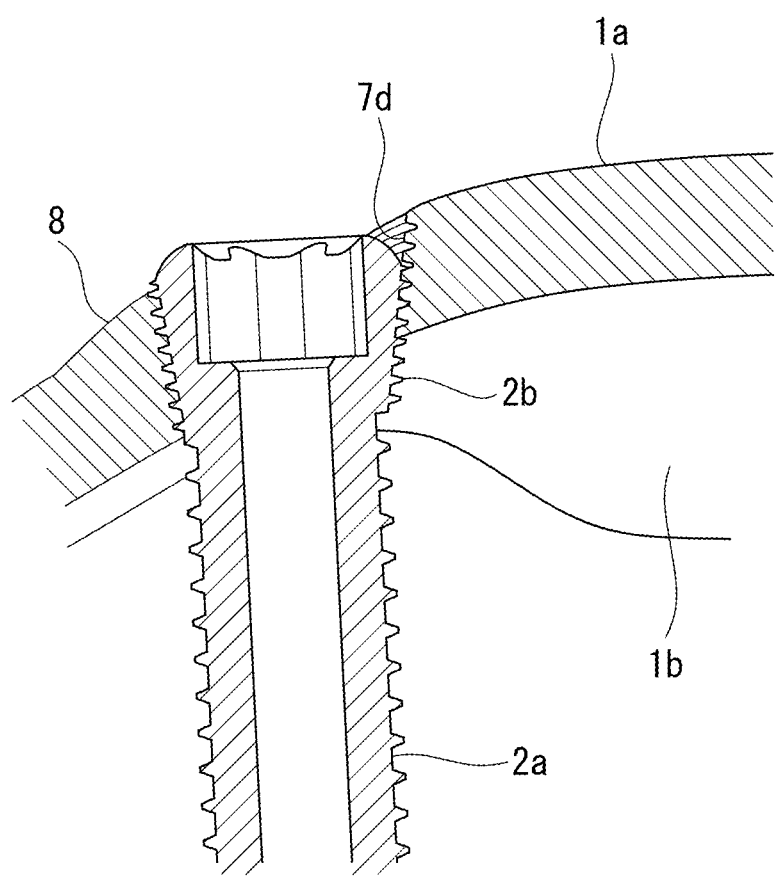
FIG. 11A is a partial vertical sectional view of the transverse section having a protrusion.
Figure 11B:
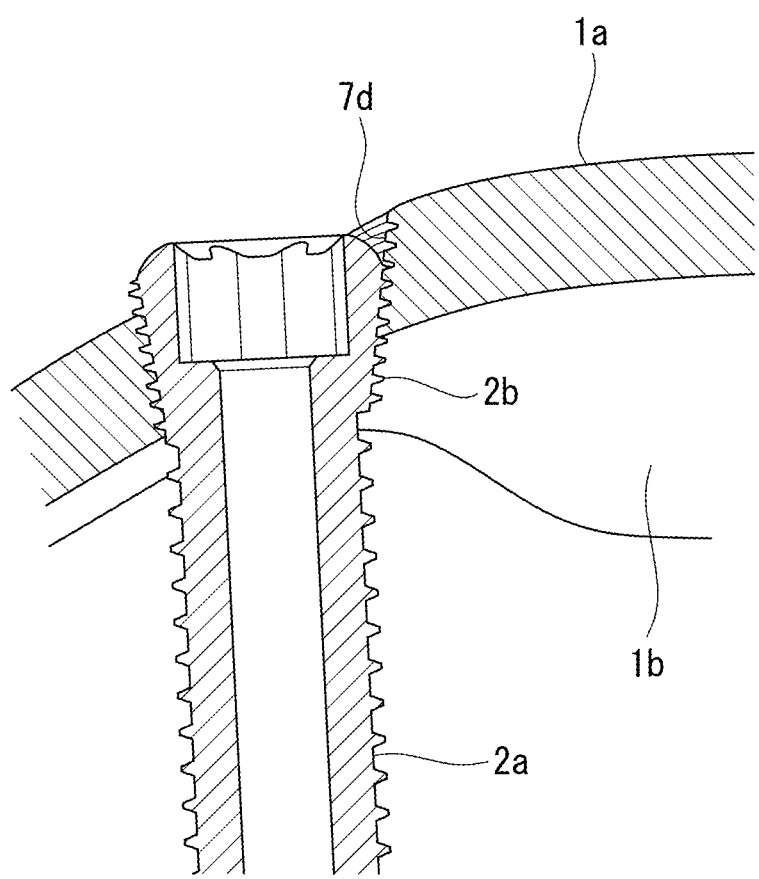
FIG. 11B is a partial vertical sectional view of the transverse section not having a protrusion.

FIGS. 11A and 11B are partial cross-sectional views of the transverse section 4 having a protrusion 8 and the transverse section 4 not having a protrusion, respectively, taken along the center axis of the through-hole 7d in the second row. The center axis of the through-hole 7d is inclined toward the distal side from the upper surface 1a toward the lower surface 1b relative to the normal to the tangent plane of the upper surface 1a or the lower surface 1b curved at the position of the through-hole 7d. In one design example, the inclination angle of the center axis of the through-hole 7d relative to the normal is 20°±5°.

As shown in FIG. 11B, in a case where a protrusion 8 is not provided around the through-hole 7d, the edge of the head 2b protrudes from the upper surface 1a at the obtuse side at which the angle formed between the center axis of the through-hole 7d and the upper surface 1a or the tangent plane is an obtuse angle. Since the head 2b protruding from the upper surface 1a may possibly come into contact with surrounding tissue, it is preferable that the head 2b not protrude from the upper surface 1a, which is smooth. The same applies to the through-holes 7a and 7c.

A protrusion 8 is provided at the obtuse side of each of the through-holes 7a, 7c, and 7d, but is not provided at the acute side of each of the through-holes 7a, 7c, and 7d. In detail, the protrusions 8 are provided at the front side of the front through-hole 7a in the first row, the rear side of the rear through-hole 7c in the first row, and the distal side of the through-hole 7d in the second row. As shown in FIG. 11A, each protrusion 8 eliminates a step between the upper surface 1a and the top surface of the head 2b in the corresponding through-hole 7a, 7c, or 7d.

By providing a protrusion 8 that covers the obtuse side of the head 2b around each of the through-holes 7a, 7c, and 7d in this manner, the edge of the head 2b can be prevented from protruding from the upper surface 1a.

Where necessary, protrusions 8 may be provided around the through-holes 6a to 6d in the upper surface 1a of the main section 3, as well as around the through-hole 7b in the upper surface 1a of the transverse section 4.

As another solution for preventing the head 2b from protruding from the upper surface 1a, the upper surface 1a may be provided with a countersunk hole that accepts the head 2b. If a countersunk hole is to be provided while ensuring the fastening length between the head 2b and the bone plate 1, the thickness of the bone plate 1 near the corresponding through-hole needs to be increased. Moreover, if the curvature of the bone plate 1 is large or if the center axis of the through-hole is significantly inclined relative to the normal to the upper surface 1a, the countersunk hole needs to be deeper, thus leading to an increase in the thickness of the bone plate 1. In order to reduce the effect that the bone plate 1 has on surrounding tissue, it is preferable that the bone plate 1 be thinner.

With each of the aforementioned protrusions 8, the head 2b can be prevented from protruding from the upper surface 1a without increasing the overall thickness of the transverse section 4, and a thin bone plate 1 can be readily achieved. The surface of the protrusion 8 located toward the through-hole 7a, 7c, or 7d may be provided with a female thread, so that the fastening length between the head 2b and the bone plate 1 can be ensured, and the securing force between the bone fixation member 2 and the bone plate 1 can be increased.

In one configuration example, the inclination angle of the center axis of each of the through-holes 7a, 7c, and 7d relative to the corresponding normal ranges between 5° and 25°, the outer diameter of the each head 2b ranges between 4.5 mm and 8 mm, the thickness of the area of the bone plate 1 excluding the protrusions 8 is 3 mm±1 mm, the maximum width of each protrusion 8 in a direction intersecting the normal is 12 mm or smaller, and the maximum protruding amount of each protrusion 8 from the upper surface 1a is 1.2 mm or smaller.

In addition to the bone plate 1, an arbitrary member having a through-hole that accommodates the head of a screw may be provided with the fastening structure having the protrusion 8. Specifically, in a case where the through-hole extends through the member from the upper surface to the lower surface thereof and the center axis of the through-hole is inclined relative to the normal to the tangent plane of the upper surface curved at the through-hole, an obtuse region in the region surrounding the through-hole in the upper surface is provided with the protrusion 8. The screw is inserted into the through-hole from the upper surface toward the lower surface, and a male thread of the head is fastened to a female thread of the through-hole.

Although the bone plate system is used in TCVO in this embodiment, the application of the bone plate system is not limited thereto. The bone plate system may be used in an arbitrary treatment of a shin bone in which the side surface of the epiphysis protrudes relative to the side surface of the diaphysis. Therefore, the bone plate 1 may be applied to sites other than the inner side surface of the shin bone A.

If a joint surface B of the knee is of a pagoda type, as shown in FIG. 12A, it may sometimes be not possible to eliminate instability of the knee by simply shifting the load line by using HTO. In other words, it is not possible to simultaneously bring both the inner side and the outer side of the joint surface B of the knee into contact with the joint surface of the thigh bone, thus causing a gap between either one of the inner side or the outer side and the joint surface.

Tibial condylar valgus osteotomy (TCVO) has been proposed as a treatment method for such a case. As shown in FIG. 12B, TCVO involves cutting the inner epiphysis into an L-shape to the joint surface and opening the cut area to bring the joint surfaces B at both the inner side and the outer side into contact with the joint surface of the thigh bone.

In the case of HTO, the cut area is opened by rotating the epiphysis relative to the diaphysis about a hinge located near the outer side surface of the shin bone A. On the other hand, in the case of TCVO, the cut area is opened by rotating the inner epiphysis relative to the diaphysis about the center of the joint surface B while lifting the epiphysis. Therefore, in the case of TCVO, the inner side surface of the epiphysis protrudes significantly inward relative to the inner side surface of the diaphysis, as compared with HTO.

Since the shape of the shin bone A after the cut area is opened is different between HTO and TCVO, a bone plate for HTO is not suitable for use in TCVO. In detail, an HTO bone plate is not conformable to a step between the inner side surface of the epiphysis and the inner side surface of the diaphysis and thus becomes apart from the bone surface. In order to reduce the effect that the bone plate has on tissue surrounding the shin bone A, it is preferable that the bone plate does not become apart or becomes little apart from the bone surface.

The present embodiments have been made in view of the circumstances described above, and an object thereof is to provide a bone plate that is suitably applicable to the side surface of a shin bone where the side surface of the epiphysis protrudes relative to the side surface of the diaphysis.

The following aspects are derived from the present disclosure.

An aspect of the present disclosure provides a bone plate to be applied to a side surface of a shin bone where a side surface of an epiphysis protrudes relative to a side surface of a diaphysis, the bone plate to be fixed to the side surface of the shin bone by bone fixation members, the bone plate including a long-plate-shaped main section that is to be disposed on the side surface of the diaphysis and that has one or more through-holes into which the bone fixation member is inserted; a transverse section that is to be disposed on the side surface of the epiphysis and that is disposed at an one end side of the main section and also that has one or more through-holes into which the bone fixation member is inserted; and a coupling section coupling the transverse section and the main section to each other, wherein the main section is twisted relative to the transverse section around an axis that is parallel to a longitudinal axis of the main section, and wherein, when the bone plate is viewed in a transverse direction of the main section, the bone plate has a shape in conformity to the side surface of the shin bone such that the coupling section is inclined relative to a longitudinal direction of the main section and the main section and the transverse section are bent to have a cranked shape in which the main section and the transverse section are offset relative to each other in a thickness direction of the bone plate.

The bone plate according to this aspect has a cranked shape in which the transverse section is offset relative to the main section in the thickness direction. Therefore, by disposing the bone plate on the side surface of the shin bone such that the direction in which the transverse section is offset relative to the main section is aligned with the direction in which the side surface of the epiphysis protrudes relative to the side surface of the diaphysis, the shape of the bone plate can conform to the shape of the side surface of the shin bone. Specifically, the main section and the transverse section can be simultaneously disposed on the side surface of the diaphysis and the side surface of the epiphysis, respectively, and can be suitably applied to the side surface of the shin bone where the side surface of the epiphysis protrudes relative to the side surface of the diaphysis. Moreover, since the main section is twisted relative to the transverse section, if the side surface of the diaphysis is disposed at a position where it is offset and twisted toward the front side or the rear side relative to the side surface of the epiphysis, the main section and the transverse section can be properly disposed on the side surface of the diaphysis and the side surface of the epiphysis, respectively.

In the above aspect, a twist angle of the transverse section relative to the main section around the axis may range between 8° and 30°.

In the above aspect, an offset amount between the main section and the transverse section in the thickness direction may be 9 mm±3 mm.

In the above aspect, the transverse section may extend in a direction corresponding to a rear side of the shin bone relative to the main section and in a direction intersecting the longitudinal direction of the main section.

According to this configuration, if the side surface of the epiphysis is offset rearward relative to the side surface of the diaphysis, the main section and the transverse section can be disposed more properly on the side surface of the diaphysis and the side surface of the epiphysis, respectively. In this configuration, when the transverse section is viewed in a shorter-dimension-side axis direction of the traverse section, a lower surface of the transverse section that is to be disposed on the side surface of the shin bone may extend through two circular arcs whose radiuses of curvature are 20 mm and 40 mm and each of which extends through opposite longitudinal ends of the transverse section.

In the above aspect, in a vertical section of the bone plate taken along a shorter-dimension-side axis of the transverse section, an angle between the shorter-dimension-side axis of the transverse section and a longitudinal axis of the coupling section may be 155°±10°, an angle between the longitudinal axis of the coupling section and the longitudinal axis of the main section may be 160°±10°, and a length between a center of a most-proximal through-hole in the main section and a center of a most-distal through-hole in the transverse section in a direction extending along the coupling section may be 38.5 mm±5 mm.

According to this configuration, an appropriate offset amount between the main section and the transverse section, for example, an offset amount of 9 mm±3 mm, can be achieved.

In the above aspect, when the transverse section is viewed in a shorter-dimension-side axis direction of the transverse section, center axes of all the through-holes in the transverse section may be oriented in directions different from each other.

The orientations of the bone fixation members to be inserted into the epiphysis via the through-holes varies depending on the position of the transverse section relative to the side surface of the epiphysis. With the center axes of all the through-holes in the transverse section being oriented in directions different from each other, the bone fixation members can be inserted more reliably to a sufficient depth from the side surface of the epiphysis.

In the above aspect, the transverse section may include three of the through-holes that are not arranged in a single line, and center axes of the three through-holes may be inclined relative to one another such that three of the bone fixation members extending through the three through-holes are in contact with one another inside the epiphysis.

Three bone screws that come into contact with one another at the distal end constitute a three-dimensional truss structure and receive a load together. The bone screws constituting such a three-dimensional truss structure can withstand a greater load, as compared with a case where the three bone screws individually receive a load.

In the above aspect, the at least one through-hole in the transverse section may include two or more of the through-holes arranged in a longitudinal direction of the transverse section, and center axes of the two or more through-holes may be inclined toward a side corresponding to a front side of the epiphysis in an insertion direction of the bone fixation member.

The transverse section tends to be disposed toward the front side relative to the side surface of the epiphysis. With the through-hole in the transverse section being inclined toward the front side, a long bone fixation member can be inserted into the epiphysis without protruding from the surface of the epiphysis even in a case where the transverse section is disposed toward the front side relative to the side surface of the epiphysis.

In the above aspect, the at least one through-hole in the transverse section may include two or more of the through-holes arranged in a longitudinal direction of the transverse section, and center axes of the two or more through-holes may be inclined at an equal angle toward a side corresponding to a distal side of the shin bone in an insertion direction of the bone fixation members.

The direction in which the bone fixation member is inserted into the epiphysis varies between a case where the transverse section is disposed toward the distal side relative to the side surface of the epiphysis and a case where the transverse section is disposed toward the proximal side. With the center axes of the through-holes being inclined at the same angle toward the distal side, the distal end of the bone fixation member can be prevented from interfering with the joint surface. In this configuration, it is preferable that the center axes of the two or more through-holes be inclined at an inclination angle of 77°±5° relative to a line segment that connects the proximal end of the transverse section with the boundary between the transverse section and the coupling section.

In the above aspect, a distance between one of the through-holes in the main section that is located closest to the transverse section and one of the through-holes in the transverse section that is located closest to the main section may range between 28.5 mm and 45.0 mm.

The bone fixation member inserted into the through-hole in the main section that is located closest toward the transverse section and the bone fixation member inserted into the through-hole in the transverse section that is located closest toward the main section extend through near the cut surface. With the aforementioned gap being 28.5 mm or larger, the bone fixation members can be prevented from interfering with the cut surface. Moreover, with the aforementioned gap being 45.0 mm or smaller, the bone fixation members can be prevented from being excessively distant from the cut surface.

In the above aspect, the bone plate may have a lower surface disposed on the side surface of the shin bone and an upper surface that is opposite to the lower surface and that is disposed opposite the side surface of the shin bone. A center axis of at least one of the through-holes in each of the main section and the transverse section may be inclined relative to a normal to a tangent plane of the upper surface. The upper surface may have a protrusion provided around the at least one through-hole. The protrusion may be provided at a side where an angle formed between the center axis and the tangent plane is an obtuse angle.

In a case where the protrusion is not provided, the edge of the head within the through-hole where the center axis is inclined relative to the normal to the tangent plane protrudes from the upper surface at the obtuse side. With the protrusion provided, the obtuse side of the head within the through-hole is covered by the protrusion, so that the edge of the head can be prevented from protruding from the upper surface.

The above aspects are advantageous in being suitably applicable to the side surface of a shin bone where the side surface of the epiphysis protrudes relative to the side surface of the diaphysis.

REFERENCE SIGNS LIST 1 bone plate
1a upper surface
1b lower surface
2 bone fixation member
2a shaft
2b head
2c hollow section
3 main section
4 transverse section
5 coupling section
6a, 6b, 6c, 6d, 7a, 7b, 7c, 7d through-hole
8 protrusion
A shin bone
B joint surface
C epiphysis
C1 bone fragment
C2 outer epiphysis
D diaphysis
E cut area

The invention claimed is:

1. A bone plate for a tibial condylar valgus osteotomy, which is configured to be applied to an inner side surface of a shin bone where an inner side surface of an epiphysis protrudes relative to an inner side surface of a diaphysis, the bone plate being configured to be fixed to the inner side surface of the shin bone by bone fixation members, and the bone plate comprising:
  a long-plate-shaped main section that is configured to be disposed on the inner side surface of the diaphysis and that has one or more through-holes into which the bone fixation members are inserted;
  a transverse section that is configured to be disposed on the inner side surface of the epiphysis and that is disposed at an end side of the main section and also that has one or more through-holes into which the bone fixation members are inserted; and
  a coupling section coupling the transverse section and the main section to each other,
  wherein the main section is twisted relative to the transverse section around an axis that is parallel to a longitudinal axis of the main section,
  wherein, when the bone plate is viewed in a transverse direction of the main section, the bone plate is configured to conform to the inner side surface of the shin bone such that the coupling section is inclined relative to a longitudinal direction of the main section and the main section and the transverse section are bent to have a cranked shape in which the main section and the transverse section are offset relative to each other in a thickness direction of the bone plate,
  wherein a twist angle of the transverse section relative to the main section around the axis ranges between 8° and 30°, and
  wherein an offset amount between the main section and the transverse section in the thickness direction is 9 mm±3 mm.

2. The bone plate according to claim 1, wherein the transverse section extends in a direction configured to correspond to a rear side of the shin bone relative to the main section and in the direction intersects the longitudinal direction of the main section, and the traverse section curves in another direction intersecting the longitudinal direction of the main section, and wherein, when the transverse section is viewed in a shorter-dimension-side axis direction of the traverse section, a lower surface of the transverse section that is configured to be disposed on the inner side surface of the shin bone extends through two circular arcs whose radiuses of curvature are 20 mm and 40 mm and each of which extends through each of opposite longitudinal ends of the transverse section.

3. The bone plate according to claim 2, wherein the transverse section comprises two or more of the through-holes arranged in a longitudinal direction of the transverse section, and wherein center axes of the two or more through-holes are configured to incline toward a front side of the epiphysis in an insertion direction of the bone fixation members and the center axes are configured to incline at an equal angle toward a distal side of the shin bone in the insertion direction of the bone fixation member.

4. The bone plate according to claim 1, wherein, in a vertical section of the bone plate taken along a shorter-dimension-side axis of the transverse section, an angle in the thickness direction of the bone plate between the shorter-dimension-side axis of the transverse section and a longitudinal axis of the coupling section is 155°±10°, an angle in the thickness direction of the bone-plate between the longitudinal axis of the coupling section and the longitudinal axis of the main section is 160°±10°, and a length between a center of a most-proximal through-hole in the main section and a center of a most-distal through-hole in the transverse section in a direction extending along the coupling section is 38.5 mm±5 mm.

5. The bone plate according to claim 1, wherein, when the transverse section is viewed in a shorter-dimension-side axis direction of the transverse section, center axes of all the through-holes in the transverse section are oriented in directions different from each other.

6. The bone plate according to claim 5, wherein the transverse section has a first through-hole, a second through-hole, and a third through-hole that are arranged sequentially in a longitudinal direction of the transverse section from a side configured to be arranged at a front side of the epiphysis toward a side configured to be arranged at a rear side of the epiphysis, wherein a center axis of the first through-hole is inclined at 23°±5° relative to a normal to a tangent plane of a lower surface of the first through-hole, wherein a center axis of the second through-hole is inclined at 8.5°±5° relative to a normal to a tangent plane of a lower surface of the second through-hole, and wherein a center axis of the third through-hole is inclined at 9.5°±5° relative to a normal to a tangent plane of a lower surface of the third through-hole.

7. The bone plate according to claim 1, wherein the transverse section comprises three of the through-holes, and wherein center axes of the three through-holes are inclined relative to one another such that three of the bone fixation members extending through the three through-holes come in contact with one another inside the epiphysis.

8. The bone plate according to claim 1, wherein a distance between one of the through-holes in the main section that is located closest to the transverse section and one of the through-holes in the transverse section that is located closest to the main section ranges between 28.5 mm and 45.0 mm.

9. The bone plate according to claim 1, wherein the main section has a width ranging between 11 mm and 18 mm, wherein the transverse section has a width ranging between 20 mm and 40 mm, wherein the coupling section has a width ranging between 12 mm and 25 mm, wherein the bone plate has a thickness of 3 mm±1 mm, and wherein the bone plate has a shape that satisfies conditions indicated below in a vertical section of the bone plate taken along a shorter-dimension-side axis of the transverse section:

33.5 mm≤L2≤43.5 mm
54 mm≤L1+L2≤64 mm
104 mm≤L1+L2+L3≤135 mm wherein

L1 denotes a length between a proximal end of the transverse section and a center axis of a most-distal through-hole in the transverse section, L2 denotes a length between the center axis of the most-distal through-hole in the transverse section and a center axis of a most-proximal through-hole in the main section, and L3 denotes a length between the center axis of the most-proximal through-hole in the main section and a distal end of the main section.

10. The bone plate according to claim 1, wherein all the through-holes in the transverse section are disposed at a side configured to be arranged at a rear side of the shin bone relative to the longitudinal axis of the main section, and wherein, when the bone plate is viewed along the longitudinal axis of the main section, extensions of center axes of at least two of the through-holes in the main section and extensions of center axes of at least two of the through-holes in the transverse section intersect with each other between opposite ends of the bone plate in the transverse direction of the main section.

11. A bone plate configured to be applied to an inner side surface of a shin bone where an inner side surface of an epiphysis protrudes relative to an inner side surface of a diaphysis, the bone plate being configured to be fixed to the inner side surface of the shin bone by bone fixation members, and the bone plate comprising:

a long-plate-shaped main section that is configured to be disposed on the inner side surface of the diaphysis and that has one or more through-holes into which the bone fixation members are inserted;

a transverse section that is configured to be disposed on the inner side surface of the epiphysis and that is disposed at an end side of the main section and also that has one or more through-holes into which the bone fixation members are inserted; and a coupling section coupling the transverse section and the main section to each other, wherein the main section is twisted relative to the transverse section around an axis that is parallel to a longitudinal axis of the main section, wherein, when the bone plate is viewed in a transverse direction of the main section, the bone plate is configured to conform to the inner side surface of the shin bone such that the coupling section is inclined relative to a longitudinal direction of the main section and the main section and the transverse section are bent to have a cranked shape in which the main section and the transverse section are offset relative to each other in a thickness direction of the bone plate, wherein the bone plate comprises a lower surface configured to be disposed on the inner side surface of the shin bone and an upper surface that is configured to be opposed to the lower surface and that is configured to be disposed opposite the inner side surface of the shin bone, wherein a center axis of at least one of the through-holes in each of the main section and the transverse section is inclined relative to a normal to a tangent plane of the upper surface, wherein the upper surface has a protrusion provided around the at least one through-hole, and wherein the protrusion is provided at a side where an angle formed between the center axis and the tangent plane is an obtuse angle.

12. The bone plate according to claim 11, wherein the center axis of the at least one through-hole is inclined at 5° to 25° relative to the normal, wherein a head of the bone fixation member disposed in the through-hole has an outer diameter ranging between 4.5 mm and 8 mm, wherein a maximum width of the protrusion in a direction intersecting the normal is 12 mm or smaller, and wherein a maximum protruding amount of the protrusion from the upper surface surrounding the protrusion is 1.2 mm or smaller.

13. A bone plate for a tibial condylar valgus osteotomy, which is configured to be applied to an inner side surface of a shin bone where an inner side surface of an epiphysis protrudes relative to an inner side surface of a diaphysis, the bone plate being configured to be fixed to the inner side surface of the shin bone by bone fixation members, and the bone plate comprising:

a long-plate-shaped main section that is configured to be disposed on the inner side surface of the diaphysis and that has one or more through-holes into which the bone fixation members are inserted;

a transverse section that is configured to be disposed on the inner side surface of the epiphysis and that is disposed at an end side of the main section and also that has one or more through-holes into which the bone fixation members are inserted; and a coupling section coupling the transverse section and the main section to each other, wherein the main section is twisted relative to the transverse section around an axis that is parallel to a longitudinal axis of the main section, wherein, when the bone plate is viewed in a transverse direction of the main section, the bone plate is configured to conform to the inner side surface of the shin bone such that the coupling section is inclined relative to a longitudinal direction of the main section and the main section and the transverse section are bent to have a cranked shape in which the main section and the transverse section are offset relative to each other in a thickness direction of the bone plate, wherein a twist angle of the transverse section relative to the main section around the axis ranges between 8° and 30°, wherein an offset amount between the main section and the transverse section in the thickness direction is 9 mm±3 mm, and wherein, in a vertical section of the bone plate taken along a shorter-dimension-side axis of the transverse section, an angle in a bone-plate-thickness direction between the shorter-dimension-side axis of the transverse section and a longitudinal axis of the coupling section is 155°±10°, an angle in the bone-plate-thickness direction between the longitudinal axis of the coupling section and the longitudinal axis of the main section is 160°±10°.

* * * * *